US012809392B2

(12) United States Patent
Iwahori

(10) Patent No.: US 12,809,392 B2
(45) Date of Patent: Nov. 24, 2026

(54) MONITORING DEVICE, MONITORING METHOD, AND SYSTEM

(71) Applicant: TOYOTA JIDOSHA KABUSHIKI KAISHA, Toyota (JP)

(72) Inventor: Kento Iwahori, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 66 days.

(21) Appl. No.: 18/966,413

(22) Filed: Dec. 3, 2024

(65) Prior Publication Data

US 2025/0208627 A1 Jun. 26, 2025

(30) Foreign Application Priority Data

Dec. 25, 2023 (JP) ................................ 2023-217974

(51) Int. Cl.

| | |
|---|---|
| ***G07C 5/02*** | (2006.01) |
| ***G05D 1/617*** | (2024.01) |
| *B62D 65/18* | (2006.01) |

(52) U.S. Cl.

CPC ............... *G05D 1/617* (2024.01); *G07C 5/02* (2013.01); *B62D 65/18* (2013.01)

(58) Field of Classification Search

CPC ........ G05D 1/617; G05D 1/225; G05D 1/249; G05D 2105/45; G05D 2107/70; G05D 2109/10; G05D 2111/10; G07C 5/02; B62D 65/18; B25J 9/1676; G05B 19/4061; G05B 2219/25196; G05B 2219/2637; G05B 2219/40202; G05B 19/41805; G05B 19/4185; G05B 19/41895; G05B 19/0428; G05B 2219/24024

See application file for complete search history.

(56) References Cited

U.S. PATENT DOCUMENTS

2017/0320529 A1 11/2017 Nordbruch
2020/0198714 A1 6/2020 Watanabe et al.
2021/0397180 A1* 12/2021 Thomas ............... B62D 63/025

FOREIGN PATENT DOCUMENTS

CN 111930079 A * 6/2020
JP 2017-538619 A 12/2017
JP 2020-100179 A 7/2020
JP 2021-62790 A 4/2021

OTHER PUBLICATIONS

Texas Instruments, "WiLink™ 8 WLAN Features, User's Guide", Literature No. SWRU423A, Jul. 2015, Revised May 2016 (44 pages total).

* cited by examiner

*Primary Examiner* — Michael V Kerrigan
(74) *Attorney, Agent, or Firm* — Sughrue Mion, PLLC

(57) ABSTRACT

A monitoring device includes a monitoring unit configured to execute monitoring related to safety of a mobile body that is movable within a manufacturing process via unmanned driving, in which an aspect of the monitoring of the monitoring unit when the mobile body is in a first process is different from an aspect of the monitoring of the monitoring unit when the mobile body is in a second process.

19 Claims, 9 Drawing Sheets

FIG. 3

| | FIRST STATE | SECOND STATE |
|---|---|---|
| MANUFACTURING STAGE | NOT COMPLETED | COMPLETED |
| MAXIMUM TRAVELING SPEED | LOW | HIGH |
| DEGREE OF COEXISTENCE WITH PERSON | HIGH | LOW |
| ROAMING FREQUENCY | LOW | HIGH |
| NUMBER OF MOUNTED INTERNAL SENSORS | SMALL | LARGE |
| NUMBER OF MOUNTED SAFETY SENSORS | SMALL | LARGE |
| NUMBER OF ASSEMBLED EXTERIOR COMPONENTS | SMALL | LARGE |
| TRAVELING PLACE | INDOORS | OUTDOORS |

FIG. 4

Mr1

| MONITORING ITEMS | ASPECT OF MONITORING | |
|---|---|---|
| | FIRST STATE | SECOND STATE |
| COMMUNICATION | DETERMINATION CYCLE IS SHORT | DETERMINATION CYCLE IS LONG |
| SAFETY SENSOR | DEGREE OF USE IS LOW | DEGREE OF USE IS HIGH |
| MOTOR TORQUE | ALLOWABLE RANGE IS NARROW | ALLOWABLE RANGE IS WIDE |
| INTERNAL SENSOR | DEGREE OF USE IS LOW | DEGREE OF USE IS HIGH |

Mr2

| MONITORING ITEMS | ASPECT OF MONITORING | |
|---|---|---|
| | FIRST STATE | SECOND STATE |
| EXTERNAL SENSOR | DEGREE OF USE IS HIGH | DEGREE OF USE IS LOW |
| STEERING ANGLE | CONTROL GAIN IS SMALL AND UPPER LIMIT VALUE IS SMALL | CONTROL GAIN IS LARGE AND UPPER LIMIT VALUE IS LARGE |
| TRAVELING SPEED | MAXIMUM TRAVELING SPEED IS LOW | MAXIMUM TRAVELING SPEED IS HIGH |

FIG. 8

Mr1v

| MONITORING ITEMS | ASPECT OF MONITORING | |
|---|---|---|
| | FIRST STATE | SECOND STATE |
| COMMUNICATION | DETERMINATION CYCLE IS SHORT | DETERMINATION CYCLE IS LONG |
| SAFETY SENSOR | DEGREE OF USE IS LOW | DEGREE OF USE IS HIGH |
| MOTOR TORQUE | ALLOWABLE RANGE IS NARROW | ALLOWABLE RANGE IS WIDE |
| INTERNAL SENSOR | DEGREE OF USE IS LOW | DEGREE OF USE IS HIGH |
| SAFETY SENSOR | CONTROL GAIN IS SMALL AND UPPER LIMIT VALUE IS SMALL | CONTROL GAIN IS LARGE AND UPPER LIMIT VALUE IS LARGE |
| TRAVELING SPEED | MAXIMUM TRAVELING SPEED IS LOW | MAXIMUM TRAVELING SPEED IS HIGH |
| EXTERNAL SENSOR | DEGREE OF USE IS LOW | DEGREE OF USE IS HIGH |

MONITORING DEVICE, MONITORING METHOD, AND SYSTEM

CROSS-REFERENCE TO RELATED APPLICATION

This application claims priority to Japanese Patent Application No. 2023-217974 filed on Dec. 25, 2023. The disclosure of the above-identified application, including the specification, drawings, and claims, is incorporated by reference herein in its entirety.

BACKGROUND

1. Technical Field

The present disclosure relates to a monitoring device, a monitoring method, and a system.

2. Description of Related Art

Japanese Unexamined Patent Application Publication No. 2017-538619 (JP 2017-538619 A) discloses a technique for causing a vehicle to travel via unmanned driving in a vehicle manufacturing process.

SUMMARY

In a case where a mobile body, such as a vehicle, is manufactured by using unmanned driving, a function or characteristics of the mobile body may be changed by a component being assembled to the mobile body. In addition, the safety performance requested for the mobile body may be changed as the manufacturing process progresses. As described above, there is a demand for a technique for appropriately monitoring a mobile body of which a state or an environment is sequentially changed in the manufacturing process.

The present disclosure can be implemented in the following aspects.

A first aspect of the present disclosure provides a monitoring device. The monitoring device includes a monitoring unit. The monitoring unit is configured to execute monitoring related to safety of a mobile body that is movable within a manufacturing process via unmanned driving. An aspect of the monitoring of the monitoring unit when the mobile body is in a first process is different from an aspect of the monitoring of the monitoring unit when the mobile body is in a second process.

According to the first aspect of the present disclosure, since the aspect of the monitoring is different depending on the process, the monitoring of the mobile body of which a state or an environment is sequentially changed in the manufacturing process can be appropriately executed.

In the first aspect of the present disclosure, the monitoring unit may be configured to, at a predetermined cycle, determine whether or not communication is interrupted, and the cycle in the first process may be shorter than the cycle in the second process.

According to this configuration, as the monitoring related to the safety of the mobile body, the monitoring related to the interruption of the communication can be appropriately executed.

In the first aspect of the present disclosure, the monitoring unit may be configured to execute the monitoring by using a safety sensor mounted in the mobile body, and the monitoring unit may be configured to, in the second process, execute the monitoring by using the safety sensor with a higher degree of use than a degree of use of the safety sensor in the first process.

According to this configuration, as the monitoring related to the safety of the mobile body, the monitoring using the safety sensor can be appropriately executed.

In the first aspect of the present disclosure, the number of the safety sensors mounted in the mobile body in the second process may be larger than the number of the safety sensors mounted in the mobile body in the first process.

According to this configuration, the degree of use of the safety sensor in the monitoring can be increased in accordance with the number of the safety sensors mounted in the mobile body, and the mounted safety sensor can be more effectively used in the monitoring.

In the first aspect of the present disclosure, the monitoring unit may be configured to monitor a motor torque of the mobile body, the monitoring unit may be configured to determine that the mobile body is not in a normal state when a degree of change in the motor torque exceeds an allowable range, and the allowable range of the degree of change in the motor torque in the first process may be narrower than the allowable range in the second process.

According to this configuration, as the monitoring related to the safety of the mobile body, the monitoring of the motor torque can be more appropriately executed.

In the first aspect of the present disclosure, the monitoring unit may be configured to monitor approach between the mobile body and an object outside the mobile body by using an external sensor located outside the mobile body, and the monitoring unit may be configured to, in the first process, monitor the approach between the mobile body and the object outside the mobile body by using the external sensor with a higher degree of use than a degree of use of the external sensor in the second process.

According to this configuration, as the monitoring related to the safety of the mobile body, the monitoring of the approach using the external sensor can be more appropriately executed.

In the first aspect of the present disclosure, the monitoring unit may be configured to monitor approach between the mobile body and an object outside the mobile body by using an internal sensor mounted in the mobile body, and the monitoring unit may be configured to, in the second process, monitor the approach between the mobile body and the object outside the mobile body by using the internal sensor with a higher degree of use than a degree of use of the internal sensor in the first process.

According to this configuration, as the monitoring related to the safety of the mobile body, the monitoring of the approach using the internal sensor can be more appropriately executed.

In the first aspect of the present disclosure, the monitoring unit may be configured to execute monitoring related to a steering angle of a vehicle as the mobile body, and the monitoring unit may be configured to, in the first process, execute the monitoring related to the steering angle of the vehicle by using a smaller control gain of the steering angle than a control gain of the steering angle in the second process.

According to this configuration, as the monitoring related to the safety of the mobile body, the monitoring related to the steering angle can be more appropriately executed.

In the first aspect of the present disclosure, the monitoring unit may be configured to execute monitoring related to a steering angle of a vehicle as the mobile body, and the monitoring unit may be configured to, in the first process, determine a traveling abnormality of the vehicle by using a smaller upper limit value of the steering angle than an upper limit value of the steering angle in the second process.

According to this configuration, as the monitoring related to the safety of the mobile body, the monitoring related to the steering angle can be more appropriately executed.

In the first aspect of the present disclosure, the monitoring unit may be configured to monitor a movement speed of the mobile body, the monitoring unit may be configured to, in the first process, determine that a movement state of the mobile body is abnormal when the movement speed of the mobile body exceeds a first maximum movement speed threshold value, the monitoring unit may be configured to, in the second process, determine that the movement state of the mobile body is abnormal when the movement speed of the mobile body exceeds a second maximum movement speed threshold value, and the first maximum movement speed threshold value may be smaller than the second maximum movement speed threshold value.

According to this configuration, as the monitoring related to the safety of the mobile body, the monitoring of the movement speed can be more appropriately executed.

In the first aspect of the present disclosure, a degree of coexistence of the mobile body with a person may be higher in the first process than in the second process.

According to this configuration, the monitoring can be appropriately executed in accordance with the change in the degree of coexistence with a person in the manufacturing process.

In the first aspect of the present disclosure, a maximum movement speed of the mobile body may be lower in the first process than in the second process.

According to this configuration, the monitoring can be appropriately executed in accordance with the change in the maximum movement speed in the manufacturing process.

In the first aspect of the present disclosure, a roaming frequency of the mobile body may be lower in the first process than in the second process.

According to this configuration, the monitoring can be appropriately executed in accordance with the change in the roaming frequency in the manufacturing process.

In the first aspect of the present disclosure, the number of sensors mounted in the mobile body may be smaller in the first process than in the second process.

According to this configuration, the monitoring can be appropriately executed in accordance with the change in the number of the mounted sensors in the manufacturing process.

In the first aspect of the present disclosure, the number of exterior components assembled to the mobile body may be smaller in the first process than in the second process.

According to this configuration, the monitoring can be appropriately executed in accordance with the change in the number of the assembled exterior components in the manufacturing process.

In the first aspect of the present disclosure, the mobile body may be not completed in the first process, and the mobile body may be completed in the second process.

According to this configuration, the monitoring can be appropriately executed depending on whether the mobile body is completed or not completed in the manufacturing process.

In the first aspect of the present disclosure, the mobile body may move indoors in the first process, and the mobile body may move outdoors in the second process.

According to this configuration, the monitoring can be appropriately executed depending on whether the mobile body moves indoors or outdoors.

A second aspect of the present disclosure relates to a monitoring method. The monitoring method includes executing monitoring related to safety of a mobile body that moves within a manufacturing process. An aspect of the monitoring is different between when the mobile body is in a first process and when the mobile body is in a second process.

A third aspect of the present disclosure relates to a system that executes monitoring related to safety of a mobile body. The system includes the mobile body. The mobile body is movable within a manufacturing process via unmanned driving. An aspect of the monitoring is different between when the mobile body is in a first process and when the mobile body is in a second process.

In the third aspect of the present disclosure, the system may be configured to monitor approach between the mobile body and an object outside the mobile body by using an external sensor located outside the mobile body and an internal sensor mounted in the mobile body, and the system may be configured to: in the first process, monitor the approach between the mobile body and the object outside the mobile body by using the external sensor with a higher degree of use than a degree of use of the external sensor in the second process; and in the first process, monitor the approach between the mobile body and the object outside the mobile body by using the internal sensor with a lower degree of use than a degree of use of the internal sensor in the second process.

According to this configuration, the external sensor and the internal sensor can be effectively cooperated in the monitoring.

The present disclosure can be implemented, for example, in a form of a mobile body, a server, a program, a non-transitory recording medium on which the program is recorded, or a program product, in addition to the form other than the monitoring device, the monitoring method, and the system as described above. The program product may be provided, for example, as a recording medium on which the program is recorded or may be provided as a program product that can be distributed via a network.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram showing a difference in a vehicle situation between a first process and a second process;

FIG. 4 is a diagram showing monitoring according to the first embodiment;

FIG. 8 is a diagram showing monitoring according to the second embodiment;

DETAILED DESCRIPTION OF EMBODIMENTS

A. First Embodiment

Figure 1:
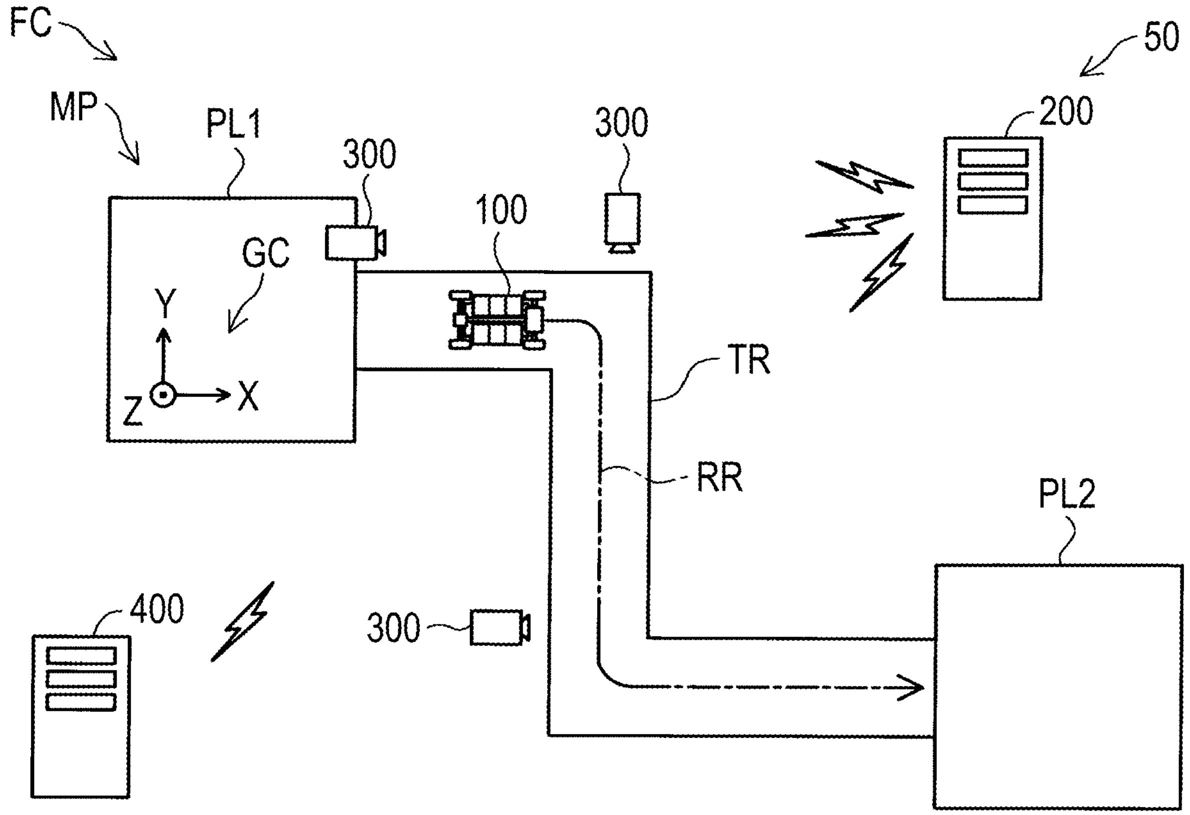
FIG. 1 is a conceptual diagram showing a configuration of a system according to a first embodiment.

FIG. 1 is a conceptual diagram showing a configuration of a system 50 according to a first embodiment. The system 50 includes one or more vehicles 100 as mobile bodies, a server 200, one or more external sensors 300, and a process management device 400.

In the present disclosure, the "mobile body" means an object that can move, for example, a vehicle or an electric vertical take-off and landing aircraft (so-called flying car). The vehicle may be a vehicle that travels using wheels or a vehicle that travels using a caterpillar, and is, for example, a passenger car, a truck, a bus, a two-wheeled vehicle, a four-wheeled vehicle, a tank, and a construction vehicle. The vehicle includes a battery electric vehicle (BEV), a gasoline vehicle, a hybrid electric vehicle, and a fuel cell electric vehicle. In a case where the mobile body is other than the vehicle, the expression of "vehicle" and "car" according to the present disclosure can be replaced with "mobile body" as appropriate, and the expression of "travel" can be replaced with "move" as appropriate.

The vehicle 100 is configured to travel via unmanned driving. The "unmanned driving" means driving that does not depend on a traveling operation of an occupant. The traveling operation means an operation related to at least any one of "traveling", "turning", and "stopping" of the vehicle 100. The unmanned driving is implemented by automatic or manual remote control using a device located outside the vehicle 100 or by autonomous control of the vehicle 100. The occupant who does not perform the traveling operation may get on the vehicle 100 that travels via the unmanned driving. Examples of the occupant who does not perform the traveling operation include a person who simply sits on a seat of the vehicle 100 and a person who performs work different from the traveling operation, such as assembly, inspection, or operation of switches, in a state of getting on the vehicle 100. The driving via the traveling operation of the occupant may be referred to as "manned driving".

In the present disclosure, the "remote control" includes "complete remote control" in which all the operations of the vehicle 100 are completely decided from the outside of the vehicle 100, and "partial remote control" in which a part of the operations of the vehicle 100 is decided from the outside of the vehicle 100. In addition, the "autonomous control" includes "complete autonomous control" in which the vehicle 100 autonomously controls the operation thereof without receiving any information from an external device of the vehicle 100, and "partial autonomous control" in which the vehicle 100 autonomously controls the operation thereof by using the information received from the external device of the vehicle 100.

The vehicle 100 need solely have a configuration capable of moving via the unmanned driving, and, for example, may have a form of a platform having a configuration described below. Specifically, the vehicle 100 need solely include at least a vehicle control device and an actuator group that are described below, in order to exhibit the three functions of "traveling", "turning", and "stopping" via the unmanned driving. In a case where the information is acquired from the device outside the vehicle 100 for the unmanned driving, the vehicle 100 need solely further include a communication device. That is, the vehicle 100 that can move via the unmanned driving need not be mounted with at least a part of interior components, such as a driver's seat and a dashboard, need not be mounted with at least a part of exterior components, such as a bumper and a fender mirror, and need not be mounted with a bodyshell. In this case, the remaining components, such as the bodyshell, may be mounted in the vehicle 100 before the vehicle 100 is shipped from a factory FC, or the remaining components, such as the bodyshell, may be mounted in the vehicle 100 after the vehicle 100 is shipped from the factory FC in a state where the remaining components, such as the bodyshell, are not mounted in the vehicle 100. Each component may be mounted from any direction, such as an upper side, a lower side, a front side, a rear side, a right side, or a left side of the vehicle 100, and may be mounted from the same direction or different directions.

The system 50 is used in the factory FC that manufactures the vehicle 100. A reference coordinate system of the factory FC is a global coordinate system GC, and any position in the factory FC can be expressed by coordinates of X, Y, and Z in the global coordinate system GC. In the factory FC, a manufacturing process MP related to the manufacturing of the vehicle 100 is executed. The manufacturing process MP includes various processes related to the manufacturing of the vehicle 100, such as an assembly process of assembling various components to the vehicle 100, various inspection processes of inspecting the vehicle 100, a transport process of transporting an incomplete or complete vehicle 100, a shipment process of shipping the complete vehicle 100, and a waiting process of waiting for each process. It can also be said that the vehicle 100 is configured to move within the manufacturing process MP via the unmanned driving. In the present disclosure, a state where the vehicle 100 is completed means a state where the assembly of all of the components for configuring the vehicle 100 has been finished in the manufacturing process MP.

The factory FC includes a first place PL1 and a second place PL2. The first place PL1 and the second place PL2 are connected by a track TR on which the vehicle 100 can travel. At the first place PL1 according to the present embodiment, for example, a construction process of constructing the vehicle 100 is executed. At the second place PL2, for example, the inspection process of inspecting the vehicle 100 is executed. A plurality of external sensors 300 is installed in the factory FC along the track TR. A position of each external sensor 300 in the factory FC is adjusted in advance. The vehicle 100 moves via the unmanned driving from the first place PL1 to the second place PL2 along the track TR.

Figure 2:
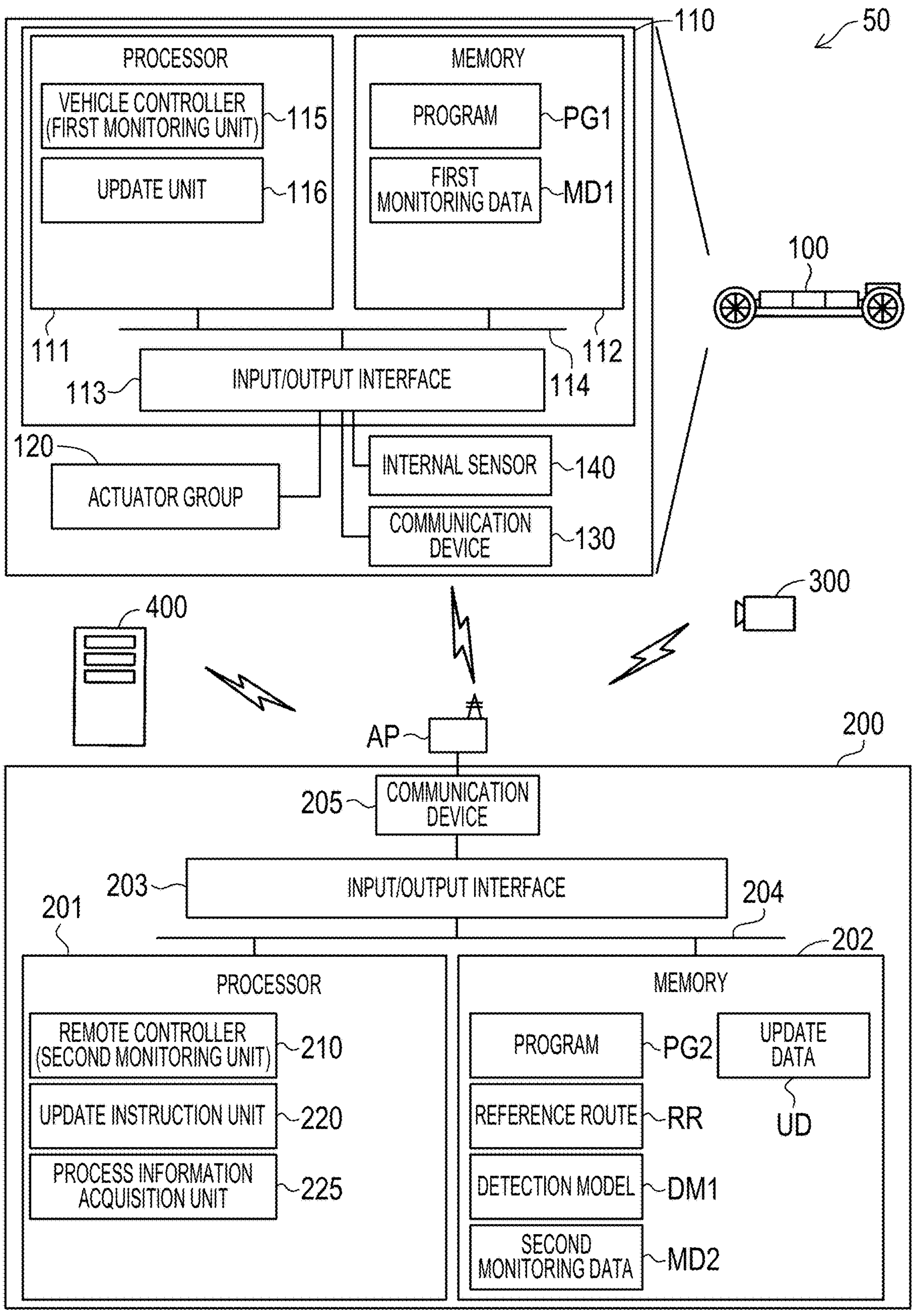
FIG. 2 is a block diagram showing a configuration of the system according to the first embodiment.

FIG. 2 is a block diagram showing the configuration of the system 50. The vehicle 100 includes a vehicle control device 110 that controls each unit of the vehicle 100, an actuator group 120 including one or more actuators that are driven under control of the vehicle control device 110, a communication device 130 that communicates with an external device, such as a server 200, via wireless communication, and one or more internal sensors 140. One or more access points AP installed in the factory FC are used for the wireless communication via the communication device 130.

The actuator group 120 includes an actuator of a drive device for accelerating the vehicle 100, an actuator of a steering device for changing a traveling direction of the vehicle 100, and an actuator of a braking device for decelerating the vehicle 100. The steering device may be a steer-by-wire type steering device. The steer-by-wire type steering device includes a steering wheel, an actuator for changing a direction of wheels in accordance with a direction of the steering wheel, and an actuator for changing the direction of the steering wheel in accordance with the direction of the wheels. In the steer-by-wire type steering device, the interlocking between the direction of the steering wheel and the direction of the wheels can be switched on and off.

The internal sensor 140 is a sensor mounted in the vehicle 100. The internal sensor 140 may include, for example, a sensor that detects a motion state of the vehicle 100, a sensor that detects an operation state of each unit of the vehicle 100, or a sensor that detects a surrounding environment of the vehicle 100. Specifically, the internal sensor 140 may include a vehicle speed sensor, a wheel speed sensor, a torque sensor, a camera, a light detection and ranging (LiDAR), a millimeter wave radar, an ultrasonic sensor, a GPS sensor, an acceleration sensor, a gyro sensor, a steering angle sensor, or the like. The torque sensor may include a sensor that detects a torque of a motor included in an actuator of an acceleration device or a sensor that detects a torque of a motor included in an actuator of the steering device. A camera included in the internal sensor 140, the LiDAR, the millimeter wave radar, the ultrasonic sensor, the torque sensor, or the like correspond to a safety sensor. The safety sensor is a sensor that detects an abnormality related to the safety of the vehicle 100 among the internal sensors 140.

The vehicle control device 110 is configured by a computer including a processor 111, a memory 112, an input/output interface 113, and an internal bus 114. The processor 111, the memory 112, and the input/output interface 113 are connected to be bidirectionally communicable with each other via the internal bus 114. The actuator group 120 and the communication device 130 are connected to the input/output interface 113. The memory 112 stores various information including a program PG1 and first monitoring data MD1. The processor 111 executes the program PG1 stored in the memory 112 to implement various functions including functions as a vehicle controller 115, an update unit 116, and a first monitoring unit described below.

The vehicle controller 115 controls the actuator group 120 to cause the vehicle 100 to travel. The vehicle controller 115 can cause the vehicle 100 to travel by controlling the actuator group 120 using a traveling control signal received from the server 200. The traveling control signal is a control signal for causing the vehicle 100 to travel. In the present embodiment, the traveling control signal includes the acceleration and a steering angle of the vehicle 100 as parameters. In other embodiments, the traveling control signal may include a speed of the vehicle 100 as the parameter instead of or in addition to the acceleration of the vehicle 100.

The vehicle control device 110 according to the present embodiment corresponds to a first monitoring device that executes monitoring related to the safety of the vehicle 100. The vehicle controller 115 according to the present embodiment functions as the first monitoring unit that executes the monitoring related to the safety of the vehicle 100. Hereinafter, the "monitoring related to the safety of the vehicle 100" is also referred to simply as monitoring. In addition, the monitoring executed by the first monitoring unit is also referred to as first monitoring. The monitoring or the first monitoring will be described in detail below.

The update unit 116 updates the first monitoring data MD1 in response to an update instruction from an update instruction unit 220 of the server 200 described below. In the present disclosure, "update of data" means executing at least any one of adding, changing, and deleting information included in the data. The update of the first monitoring data MD1 will be described in detail below.

The server 200 is configured by a computer including a processor 201, a memory 202, an input/output interface 203, and an internal bus 204. The processor 201, the memory 202, and the input/output interface 203 are connected to be bidirectionally communicable with each via the internal bus 204. A communication device 205 for communicating with various devices outside the server 200 is connected to the input/output interface 203. The communication device 205 can communicate with the vehicle 100 via wireless communication, and can communicate with each external sensor 300 via wired communication or wireless communication. The memory 202 stores various information including a program PG2 and second monitoring data MD2. The processor 201 executes the program PG2 stored in the memory 202 to implement various functions including functions as a remote controller 210, the update instruction unit 220, a process information acquisition unit 225, and a second monitoring unit described below.

The remote controller 210 acquires a detection result of the sensor, generates the traveling control signal for controlling the actuator group 120 of the vehicle 100 by using the detection result, and transmits the traveling control signal to the vehicle 100 to cause the vehicle 100 to travel via the remote control. The remote controller 210 may generate, for example, a control signal for controlling various accessories provided in the vehicle 100 or actuators for operating various kinds of equipment, such as a wiper, a power window, or a lamp, in addition to the traveling control signal, and output the generated control signal. That is, the remote controller 210 may operate the various kinds of equipment or the various accessories via the remote control.

The update instruction unit 220 transmits the update instruction for updating the first monitoring data MD1 to the vehicle 100. The update instruction will be described in detail below.

The server 200 according to the present embodiment corresponds to a second monitoring device that executes the monitoring related to the safety of the vehicle 100. The remote controller 210 according to the present embodiment also functions as the second monitoring unit that executes the monitoring. Hereinafter, the monitoring executed by the second monitoring unit is also referred to as second monitoring. The second monitoring will be described in detail below.

The process information acquisition unit 225 acquires process information related to the process in which the vehicle 100 is located. The process information acquisition unit 225 may acquire the process information from, for example, the process management device 400. In a case where a correspondence relationship between the position of the vehicle 100 and the process executed at the position is known, the process information acquisition unit 225 may acquire a current process of the vehicle 100 from position information representing a current position of the vehicle 100. In this case, as the position information of the vehicle 100, vehicle position information described below may be used, or position information coarser than the vehicle position information may be used. The process information acquisition unit 225 may acquire whether the current process is before or after a process of mounting a predetermined component in the vehicle 100, depending on whether the predetermined component is mounted in the vehicle 100. In this case, the process information acquisition unit 225 may acquire the current process of the vehicle 100 from a result of communication confirmation between the vehicle control device 110 and an electronic component mounted in the vehicle 100. The process information acquisition unit 225 may acquire the process information by acquiring, for example, the position information of the vehicle 100 or information on whether or not the predetermined component is mounted in the vehicle 100 by using the external sensor 300 or the internal sensor 140. The process information acquisition unit 225 need solely acquire at least information for specifying whether the vehicle 100 is in a first process or a second process described below, as the process information.

The external sensor 300 is a sensor located outside the vehicle 100. The external sensor 300 according to the present embodiment is a sensor that captures the vehicle 100 from the outside of the vehicle 100. The external sensor 300 includes a communication device (not shown), and can communicate with other devices, such as the server 200, via wired communication or wireless communication.

Specifically, the external sensor 300 is configured by a camera. The camera as the external sensor 300 images the vehicle 100 and outputs a captured image as the detection result.

The process management device 400 executes management of the entire manufacturing process MP of the vehicle 100. The process management device 400 is configured by at least one computer. The process management device 400 includes a communication device (not shown), and can communicate with the server 200 and various facilities of the factory FC via wired communication or wireless communication. The process management device 400 may be configured to communicate with the vehicle 100 via wireless communication through, for example, the access point AP. The process management device 400 includes a database in which various information of the vehicle 100 are recorded. The various information recorded in the database include, for example, an identification number of the vehicle 100, contents of each process, and information representing the current process of the vehicle 100. The process management device 400 may acquire a current state of the vehicle 100 via, for example, the communication with various facilities, various devices, and various sensors in the factory FC, or may acquire the current state of the vehicle 100 based on information input to the process management device 400 or the like by an operator or an administrator.

The first monitoring device and the second monitoring device correspond to a "monitoring device" according to the present disclosure. The first monitoring unit and the second monitoring unit correspond to a "monitoring unit" according to the present disclosure. An aspect of the monitoring of the monitoring unit is different between when the vehicle 100 is in the first process and when the vehicle 100 is in the second process. The second process is a process different from the first process. Hereinafter, the difference in the aspect of the monitoring between when the vehicle 100 is in the first process and when the vehicle 100 is in the second process is also referred to as "difference in the aspect of the monitoring".

In the present embodiment, the second process is a process later than the first process. Specifically, in the present embodiment, the first process is a process until the vehicle 100 is completed after the vehicle 100 is constructed to a state where the vehicle 100 can travel via the unmanned driving. The second process is a process after the vehicle 100 is completed. In the first process according to the present embodiment, for example, the assembly of the component to the vehicle 100, the inspection of the vehicle 100, or the transport of the vehicle 100 using the unmanned driving is executed as appropriate. In the second process, for example, the inspection of the vehicle 100 or the transport of the vehicle 100 using the unmanned driving is executed as appropriate.

FIG. 3 is a diagram showing a difference in the state or an environment of the vehicle 100 between the first process and the second process according to the present embodiment. Hereinafter, the state or the environment of the vehicle 100 is collectively referred to as a vehicle situation. A case where the vehicle situation is different between the first process and the second process is also referred to as a "difference in vehicle situation". As shown in FIG. 3, in the present embodiment, a manufacturing stage, a degree of coexistence with a person, a maximum traveling speed, a roaming frequency, the number of the mounted internal sensors, the number of the assembled exterior components, and a traveling place as the vehicle situations are different between the first process and the second process. As described above, regarding the manufacturing stage of the vehicle 100, the vehicle 100 is not completed in the first process, and the vehicle 100 is completed in the second process. In general, in a case where the vehicle 100 is completed, the vehicle 100 can exhibit more functions or can exhibit the functions more effectively than in a case where the vehicle 100 is not completed, so that the safety performance of the vehicle 100 is further improved. In addition, regarding the traveling place, the vehicle 100 travels indoors in the first process, and the vehicle 100 travels outdoors in the second process. In the first process, the degree of coexistence with a person is higher, the maximum traveling speed is lower, the roaming frequency is lower, the number of the mounted internal sensors is smaller, the number of the mounted safety sensors is smaller, and the number of the assembled exterior components is smaller than in the second process.

The "degree of coexistence with a person" means a degree of coexistence between the vehicle 100 and a person. Since the first process is a state where the vehicle 100 is not completed, the probability that the operator or the administrator approaches the vehicle 100 in order to perform the assembly or the inspection of the component on the vehicle 100 or the probability that the operator or the administrator gets on the vehicle 100 is higher in the first process than in the second process that is a state where the vehicle 100 is completed. Therefore, the degree of coexistence with a person is higher in the first process than in the second process.

The maximum traveling speed means a maximum value of the traveling speed of the vehicle 100. In the present embodiment, as will be described below, the monitoring includes the monitoring of the traveling speed, and a difference in the aspect of the monitoring includes a difference in the maximum traveling speed, whereby the maximum traveling speeds in the first process and the second process are defined. In the present embodiment, the maximum traveling speed in the first process is defined as a magnitude equal to or less than 1 kilometer per hour, and the maximum traveling speed in the second process is defined as a magnitude exceeding 1 kilometer per hour.

The roaming frequency represents a frequency at which the access point AP used for the communication with the vehicle 100 is switched. As the traveling speed of the vehicle 100 is higher and an installation interval between the access points AP in the factory FC is shorter, the roaming frequency is higher. In the present embodiment, although the installation intervals of the access points AP in the factory FC are substantially constant, the traveling speed of the vehicle 100 in the first process is lower than the traveling speed of the vehicle 100 in the second process, so that the roaming frequency in the first process is lower than the roaming frequency in the second process.

The number of the mounted internal sensors represents the number of the internal sensors 140 mounted in the vehicle 100. In the present embodiment, due to the fact that the vehicle 100 is not completed in the first process and the vehicle 100 is completed in the second process, the number of the mounted internal sensors in the first process is smaller than the number of the mounted internal sensors in the second process. As the number of the mounted internal sensors is larger, it is easier to use the internal sensors 140 mounted in the vehicle 100 for the monitoring, and thus the safety of the traveling of the vehicle 100 via the unmanned driving can be further improved. The number of the mounted safety sensors represents the number of the safety sensors mounted in the vehicle 100. In the first process according to the present embodiment, due to a smaller number of the mounted internal sensors, the number of the mounted safety sensors is smaller than the number of the mounted internal sensors in the second process.

The number of the assembled exterior components represents the number of the exterior components assembled to the vehicle 100. In the present embodiment, due to the fact that the vehicle 100 is not completed in the first process and the vehicle 100 is completed in the second process, the number of the assembled exterior components in the first process is smaller than the number of the assembled exterior components in the second process. As the number of the assembled exterior components is larger, the probability that a component, such as a bumper, that mitigates the impact due to the contact between the vehicle 100 and an external object is assembled to the vehicle 100 is higher, and thus the safety of the traveling of the vehicle 100 via the unmanned driving can be further improved.

The traveling place represents a place where the vehicle 100 travels. In the present embodiment, the traveling place in the first process is inside a building of the factory FC, and the traveling place in the second process is a vast yard located outside the factory FC. From the viewpoint of suppressing unneeded approach between the vehicle 100 and the external object, it is preferable that the vehicle 100 travels more carefully when the traveling place of the vehicle 100 is indoors as in the first process than when the traveling place of the vehicle 100 is outdoors as in the second process. Further, from the viewpoint of improving the manufacturing efficiency of the vehicle 100, it is preferable that the vehicle 100 travels with less restriction when the traveling place is outdoors as in the second process. In the present embodiment, a road width of the track on which the vehicle 100 travels in the first process is narrower than a road width of the track on which the vehicle 100 travels in the second process.

FIG. 4 is a diagram showing the monitoring according to the present embodiment. As shown in FIG. 4, first monitoring Mr1 according to the present embodiment includes communication monitoring, safety sensor monitoring, motor torque monitoring, and internal sensor monitoring. Second monitoring Mr2 includes external sensor monitoring, traveling speed monitoring, and steering angle gain monitoring.

The communication monitoring means monitoring related to the communication of the vehicle 100. In the communication monitoring according to the present embodiment, a determination is made, at a predetermined determination cycle, as to whether or not the communication of the vehicle 100 is interrupted. Specifically, when the communication between the vehicle 100 and the access point AP is interrupted for a time longer than the determination cycle, a determination is made that the communication of the vehicle 100 is interrupted. A case where a determination is made that the communication of the vehicle 100 is interrupted corresponds to a case where the abnormality is detected in the communication monitoring. The difference in the aspect of the monitoring in the communication monitoring includes a difference in the determination cycle. Specifically, the aspect of the communication monitoring is different between the first process and the second process in that the determination cycle in the first process is shorter than the determination cycle in the second process. The determination cycle in the first process is, for example, 100 milliseconds, and the determination cycle in the second process is, for example, 500 milliseconds.

The safety sensor monitoring means the detection of the abnormality using the safety sensor mounted in the vehicle 100. The difference in the aspect of the monitoring in the safety sensor monitoring includes a difference in a degree of use of the safety sensor. The aspect of the safety sensor monitoring is different between the first process and the second process in that the degree of use of the safety sensor in the second process is higher than the degree of use of the safety sensor in the first process. The degree of use of the safety sensor in the safety sensor monitoring is evaluated, for example, by using the number of the safety sensors used for the safety sensor monitoring per unit time. In the present disclosure, the “degree of use” of a certain element includes a case where the element is not used at all. Therefore, for example, the degree of use of the safety sensor is the lowest in a case where none of the safety sensors are used at all.

The motor torque monitoring means monitoring of the motor torque of the vehicle 100. The motor torque referred to here is, for example, the torque of the motor included in the acceleration device or the steering device, and is detected by the torque sensor as the internal sensor 140. In the motor torque monitoring according to the present embodiment, a determination is made as to whether or not a degree of change in the motor torque of the vehicle 100 exceeds a predetermined allowable range. The allowable range may be, for example, represented by an upper limit value or a lower limit value of the motor torque, represented by an upper limit value or a lower limit value of a change amount of the motor torque, or represented by a difference between an observed motor torque waveform and a predetermined reference waveform. A case where a determination is made that the degree of change in the motor torque exceeds the allowable range corresponds to a case where the abnormality is detected in the motor torque monitoring. Specifically, in a case where the degree of change in the motor torque exceeds the allowable range, there is a possibility that the vehicle 100 is riding on the external object or a possibility that the vehicle 100 is in contact with the external object. The difference in the aspect of the monitoring in the motor torque monitoring includes a difference in the allowable range of the degree of change in the motor torque. Specifically, the aspect of the motor torque monitoring is different between the first process and the second process in that the allowable range of the degree of change in the motor torque in the first process is narrower than the allowable range in the second process. As described above, the abnormality of the motor torque is detected with higher sensitivity in the motor torque monitoring by narrowing the allowable range. On the other hand, the allowable range is appropriately expanded, for example, when the vehicle 100 is caused to travel in an outdoor yard, whereby the vehicle 100 can be efficiently caused to travel while the obstruction of trivial foreign matters, such as twigs and pebbles, with respect to the traveling of the vehicle 100 is suppressed.

The internal sensor monitoring means monitoring of the approach between the vehicle 100 and the external object by using the internal sensor 140. In the internal sensor monitoring, among the internal sensors 140, for example, a sensor that detects the surrounding environment of the vehicle 100 is used. Specifically, in the internal sensor monitoring, for example, it is preferable to use at least any one of the camera, the LiDAR, the millimeter wave radar, and the ultrasonic sensor mounted in the vehicle 100. In the present embodiment, a case where a detection is made in the internal sensor monitoring that a distance between the vehicle 100 and the external object is equal to or less than a predetermined distance corresponds to a case where the abnormality is detected in the internal sensor monitoring. The difference in the aspect of the monitoring in the internal sensor monitoring includes a difference in the degree of use of the internal sensor 140. Specifically, the aspect of the internal sensor monitoring is different between the first process and the second process in that the degree of use of the internal sensor 140 in the first process is higher than the degree of use of the internal sensor 140 in the second process. The degree of use of the internal sensor 140 in the internal sensor monitoring is evaluated, for example, by using the number of the internal sensors 140 used for the internal sensor monitoring per unit time. In a case where the aspect of the monitoring in the internal sensor monitoring is changed, for example, the monitoring unit may switch the on/off of each internal sensor 140 or may switch whether or not to use the detection result of each internal sensor 140.

The traveling speed monitoring means monitoring of the traveling speed of the vehicle 100. Specifically, in the traveling speed monitoring according to the present embodiment, the traveling speed of the vehicle 100 is monitored such that the traveling speed of the vehicle 100 is equal to or lower than a predetermined maximum traveling speed. In the present embodiment, a case where the traveling speed of the vehicle 100 exceeds the maximum traveling speed corresponds to a case where the abnormality is detected in the traveling speed monitoring. The difference in the aspect of the monitoring in the traveling speed monitoring includes a difference in the maximum traveling speed. Specifically, the aspect of the traveling speed monitoring is different between the first process and the second process in that the maximum traveling speed in the first process is lower than the maximum traveling speed in the second process.

The steering angle monitoring means monitoring related to the steering angle of the vehicle 100. Specifically, in the steering angle monitoring according to the present embodiment, a control gain of the steering angle of the vehicle 100 is monitored such that the control gain of the steering angle is equal to or less than a predetermined threshold value, and the steering angle of the vehicle 100 is monitored such that the steering angle does not exceed a predetermined upper limit value. An actual measurement value of the control gain of the steering angle can be acquired based on, for example, an actual measurement value of the steering angle using the internal sensor 140 and a control value of the steering angle. The difference in the aspect of the monitoring in the steering angle monitoring includes a difference in the control gain of the steering angle and a difference in the upper limit value of the steering angle. Specifically, the aspect of the steering angle monitoring is different between the first process and the second process in that the control gain of the steering angle in the first process is smaller than the control gain of the steering angle in the second process, and the upper limit value of the steering angle in the first process is smaller than the upper limit value of the steering angle in the second process. By reducing the control gain of the steering angle to be smaller, a sudden change in the steering angle during the traveling of the vehicle 100 can be suppressed. On the other hand, by increasing the control gain of the steering angle to be larger, the steering angle can be more responsively controlled during the traveling of the vehicle 100.

The external sensor monitoring means monitoring of the approach between the vehicle 100 and the external object by using the external sensor 300. The external object is an object outside the vehicle 100, and is, for example, various devices, such as a robot or a work machine, or a person, such as the operator or the administrator. In the present embodiment, a case where a detection is made in the external sensor monitoring that a distance between the vehicle 100 and the external object is equal to or less than a predetermined distance corresponds to a case where the abnormality is detected in the external sensor monitoring. The difference in the aspect of the monitoring in the external sensor monitoring includes a difference in the degree of use of the external sensor 300. Specifically, the aspect of the external sensor monitoring is different between the first process and the second process in that the degree of use of the external sensor 300 in the first process is higher than the degree of use of the external sensor 300 in the second process. The degree of use of the external sensor 300 in the external sensor monitoring is evaluated by using the number of the external sensors 300 used for the external sensor monitoring per unit time. The external sensor 300 used in the external sensor monitoring may be, for example, an external sensor that is used for the unmanned driving of the vehicle 100 or an external sensor that is not used for the unmanned driving.

In the present embodiment, the vehicle controller 115 as the first monitoring unit or the remote controller 210 as the second monitoring unit executes at least any one of restriction processing and abnormality processing in the monitoring. The restriction processing is processing of restricting the operation of the vehicle 100 such that no abnormality occurs in the monitoring. The abnormality processing is processing of executing predetermined processing related to the abnormality in a case where the abnormality is detected in the monitoring. It is preferable that the abnormality processing includes at least any one of stop processing and notification processing. The stop processing is processing of stopping the vehicle 100. A position at which the vehicle 100 is stopped by the stop processing may be, for example, a position at which the vehicle 100 can be stopped more quickly or a predetermined evacuation place in the factory FC. The notification processing is processing of notifying a user (for example, a work vehicle or the administrator) of the abnormality. In the notification processing, an alarm device provided in the vehicle 100 may be used, or a notification device configured to communicate with the server 200 or the vehicle 100 may be used. The notification device may be, for example, a display device for displaying visual information, a speaker for outputting voice information, or a communication device for transmitting information to a portable terminal owned by the user.

In the present embodiment, the vehicle controller 115 functioning as the first monitoring unit executes the abnormality processing in the communication monitoring, the safety sensor monitoring, the motor torque monitoring, and the internal sensor monitoring. The remote controller 210 functioning as the second monitoring unit executes the abnormality processing in the external sensor monitoring and executes the restriction processing in the steering angle monitoring and the traveling speed monitoring. In the restriction processing in the traveling speed monitoring, the remote controller 210 executes feedback control or feedforward control using, for example, the vehicle speed detected by the vehicle speed sensor or the like to generate the traveling control signal such that the traveling speed of the vehicle 100 does not exceed the maximum traveling speed, thereby controlling the traveling speed of the vehicle 100. In the restriction processing in the steering angle monitoring, the remote controller 210 executes feedback control or feedforward control using, for example, the steering angle detected by the steering angle sensor or the like to generate the traveling control signal such that the control gain of the steering angle does not exceed the threshold value and the steering angle does not exceed the upper limit value, thereby controlling the steering angle of the vehicle 100.

In other embodiments, for example, both the restriction processing and the abnormality processing may be executed in the traveling speed monitoring or the steering angle monitoring. In this case, in the traveling speed monitoring, the abnormality processing may be executed, for example, when the traveling speed of the vehicle 100 exceeds the maximum traveling speed or is expected to exceed the maximum traveling speed due to some abnormality in the restriction processing. In the steering angle monitoring, the abnormality processing may be executed, for example, when the control gain of the steering angle exceeds the threshold value or is expected to exceed the threshold value, and when the steering angle exceeds the upper limit value or is expected to exceed the upper limit value.

The description is returned to FIG. 2. The vehicle controller 115 as the first monitoring unit according to the present embodiment executes the first monitoring Mr1 by using the first monitoring data MD1 stored in the memory 112. First aspect information representing the aspect of each monitoring included in the first monitoring Mr1 is included in the first monitoring data MD1. In the present embodiment, the difference in the aspect of the monitoring in the first monitoring Mr1 is implemented by updating the first monitoring data MD1 in response to the update instruction from the server 200.

The remote controller 210 as the second monitoring unit according to the present embodiment executes the second monitoring Mr2 by using the second monitoring data MD2 stored in the memory 202. Second aspect information representing the aspect of each monitoring included in the second monitoring Mr2 is included in the second monitoring data MD2. Specifically, the second monitoring data MD2 includes each process related to the vehicle 100 and the second aspect information associated with each process. In the present embodiment, the difference in the aspect of the monitoring in the second monitoring Mr2 is implemented by referring to the second monitoring data MD2 based on the acquired process information.

The update instruction unit 220 generates the update instruction by using update data UD based on the process information. The update data UD stores each process related to the vehicle 100 and third aspect information representing the aspect of each monitoring included in the first monitoring Mr1, in association with each other. The update instruction unit 220 acquires the third aspect information by referring to the update data UD based on the process information, and transmits the update instruction including the acquired third aspect information to the vehicle 100. The update unit 116 updates the first monitoring data MD1 by rewriting the first aspect information included in the first monitoring data MD1 with the third aspect information included in the received update instruction. Regarding the update of the first monitoring data MD1, in a case where the first aspect information and the third aspect information are the same as each other, the update unit 116 may rewrite the first aspect information with the third aspect information or may skip the rewriting.

Figure 5:
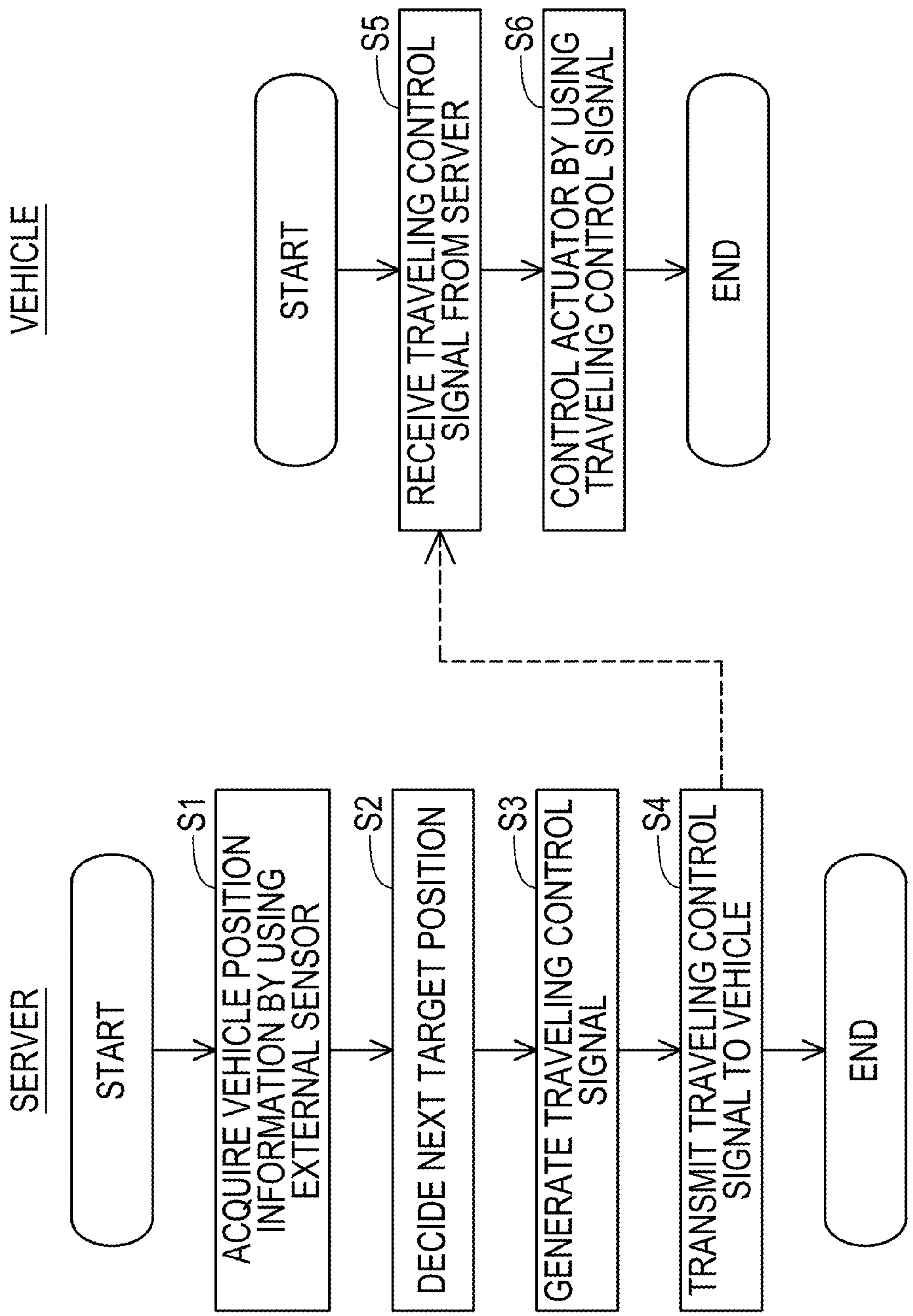
FIG. 5 is a flowchart showing a processing procedure of traveling control for a vehicle according to the first embodiment.

FIG. 5 is a flowchart showing a processing procedure of traveling control of the vehicle 100 according to the first embodiment. In the processing procedure of FIG. 5, the processor 201 of the server 200 executes the program PG2 to function as the remote controller 210. In addition, the processor 111 of the vehicle 100 executes the program PG1 to function as the vehicle controller 115. While the processing procedure of FIG. 5 is being executed, the remote controller 210 executes the second monitoring Mr2 as the second monitoring unit. In a similar manner, the vehicle controller 115 executes the first monitoring Mr1 as the first monitoring unit.

In step S1, the processor 201 of the server 200 acquires the vehicle position information by using the detection result output from the external sensor 300. The vehicle position information is position information that is a basis for generating the traveling control signal. In the present embodiment, the vehicle position information includes the position and the direction of the vehicle 100 in the global coordinate system GC of the factory FC. Specifically, in step S1, the processor 201 acquires the vehicle position information by using the captured image acquired from the camera as the external sensor 300.

Specifically, in step S1, the processor 201 detects an outer shape of the vehicle 100 from, for example, the captured image, calculates coordinates of positioning points of the vehicle 100 in a captured image coordinate system, that is, in a local coordinate system, and converts the calculated coordinates into the coordinates in the global coordinate system GC to acquire the position of the vehicle 100. The outer shape of the vehicle 100 included in the captured image can be detected, for example, by inputting the captured image to a detection model DM1 utilizing artificial intelligence (AI). The detection model DM1 is prepared, for example, inside the system 50 or outside the system 50, and is stored in advance in the memory 202 of the server 200. Examples of the detection model DM1 include a trained machine learning model that has been trained to implement any one of semantic segmentation and instance segmentation. As the machine learning model, for example, a convolutional neural network (CNN) that has been trained by supervised learning using a training data set can be used. The training data set has, for example, a plurality of training images including the vehicle 100 and a label indicating whether each area in the training image is an area indicating the vehicle 100 or an area indicating an area other than the vehicle 100. When the CNN is trained, it is preferable that parameters of the CNN are updated such that an error between an output result of the detection model DM1 and the label is reduced by backpropagation (error backpropagation method). The processor 201 can acquire the direction of the vehicle 100 by performing the estimation based on a direction of a movement vector of the vehicle 100 calculated from a positional change in a feature point of the vehicle 100 between frames of the captured image by using, for example, an optical flow method.

In step S2, the processor 201 of the server 200 decides a target position to which the vehicle 100 should head next. In the present embodiment, the target position is represented by the coordinates of X, Y, and Z in the global coordinate system GC. A reference route RR that is a route along which the vehicle 100 should travel is stored in advance in the memory 202 of the server 200. The route is represented by a node indicating a departure point, a node indicating a passing point, a node indicating a destination, and a link connecting the respective nodes. The processor 201 decides the target position to which the vehicle 100 should head next by using the vehicle position information and the reference route RR. The processor 201 decides the target position on the reference route RR ahead of the current position of the vehicle 100.

In step S3, the processor 201 of the server 200 generates the traveling control signal for causing the vehicle 100 to travel toward the decided target position. The processor 201 calculates the traveling speed of the vehicle 100 from the transition of the position of the vehicle 100, and compares the calculated traveling speed with a target speed. As a whole, the processor 201 decides the acceleration such that the vehicle 100 is accelerated when the traveling speed is lower than the target speed, and decides the acceleration such that the vehicle 100 is decelerated when the traveling speed is higher than the target speed. The processor 201 decides the steering angle and the acceleration such that the vehicle 100 does not deviate from the reference route RR when the vehicle 100 is located on the reference route RR, and decides the steering angle and the acceleration such that the vehicle 100 returns to the reference route RR when the vehicle 100 is not located on the reference route RR, in other words, when the vehicle 100 deviates from the reference route RR. In other embodiments, the traveling speed of the vehicle 100 may be acquired by using the internal sensor 140, such as the vehicle speed sensor or the wheel speed sensor.

In step S4, the processor 201 of the server 200 transmits the generated traveling control signal to the vehicle 100. The processor 201 repeatedly executes, at a predetermined cycle, the acquisition of the vehicle position information, the decision of the target position, the generation of the traveling control signal, and the transmission of the traveling control signal.

In step S5, the processor 111 of the vehicle 100 receives the traveling control signal transmitted from the server 200. In step S6, the processor 111 of the vehicle 100 controls the actuator group 120 by using the received traveling control signal, to cause the vehicle 100 to travel at the acceleration and the steering angle represented by the traveling control signal. The processor 111 repeatedly executes, at a predetermined cycle, the reception of the traveling control signal and control of the actuator group 120. With the system 50 according to the present embodiment, the vehicle 100 can be caused to travel by the remote control, and the vehicle 100 can move without using a transport facility, such as a crane or a conveyor.

Figure 6:
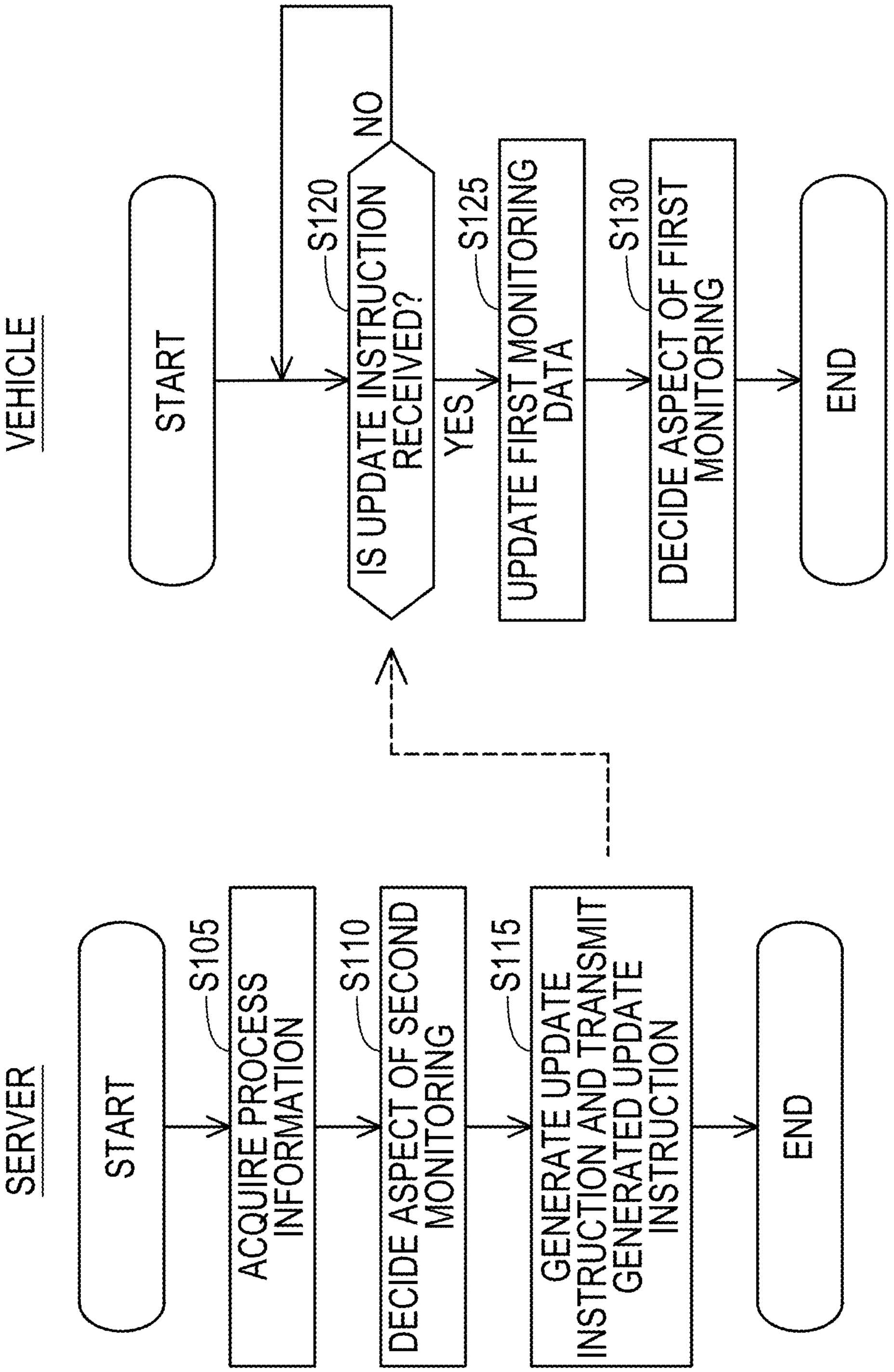
FIG. 6 is a flowchart showing a processing procedure of monitoring processing according to the first embodiment.

FIG. 6 is a flowchart showing a processing procedure of monitoring processing for implementing a monitoring method according to the present embodiment. The monitoring processing of FIG. 6 is executed by the processor 201 at a predetermined cycle, for example.

In step S105, the process information acquisition unit 225 acquires the process information of the vehicle 100. In step S110, the remote controller 210 functioning as the second monitoring unit decides the aspect of the second monitoring Mr2 by referring to the second monitoring data MD2 based on the process information acquired in step S105. Specifically, in step S110, the remote controller 210 starts the execution of the second monitoring Mr2 using the second aspect information corresponding to the process information acquired in step S105. That is, in the present embodiment, when the vehicle 100 is in the first process in step S105 of the previous monitoring processing, and the vehicle 100 is in the second process in step S105 of the current monitoring processing, the aspect of the second monitoring Mr2 is changed in step S110.

In step S115, the update instruction unit 220 generates the update instruction and transmits the generated update instruction to the vehicle 100. Specifically, in step S115, the update instruction unit 220 generates the update instruction based on the update data UD by referring to the process information acquired in step S105, and transmits the generated update instruction to the vehicle 100. In step S120, the update unit 116 of the vehicle 100 determines whether or not the update instruction is received from the server 200. In a case where the update instruction is received in step S120, in step S125, the update unit 116 updates the first monitoring data MD1 by using the received update instruction. In step S130, the vehicle controller 115 functioning as the first monitoring unit decides the aspect of the monitoring in the first monitoring Mr1 by using the updated first monitoring data MD1. Specifically, in step S130, the vehicle controller 115 starts the execution of the first monitoring Mr1 using the updated first monitoring data MD1. That is, in the present embodiment, when the vehicle 100 is in the first process in step S105 of the previous monitoring processing, and the vehicle 100 is in the second process in step S105 of the present monitoring processing, the aspect of the first monitoring Mr1 is changed in step S130.

In the monitoring processing in other embodiments, for example, a determination is made as to whether or not the state of the vehicle 100 is transitioned from the first process to the second process, and in a case where a determination is made that the state is transitioned from the first process to the second process, the processing of changing the aspect of the second monitoring Mr2 may be executed. In a substantially similar manner, in a case where the determination is made that the process is transitioned from the first process to the second process, the update instruction may be generated and transmitted.

In the monitoring device according to the present embodiment described above, the aspect of the monitoring related to the safety of the vehicle 100 is different between when the vehicle 100 is in the first process and when the vehicle 100 is in the second process. Therefore, the monitoring of the vehicle 100 in which the vehicle situation is sequentially changed within the manufacturing process MP can be more appropriately executed than in a case where the monitoring is uniformly executed.

In the present embodiment, the first monitoring Mr1 includes the communication monitoring, and the aspect of the communication monitoring is different between the first process and the second process in that the determination cycle in the first process is shorter than the determination cycle in the second process. Therefore, the communication monitoring can be appropriately executed. Specifically, in the present embodiment, in the first process, the interruption of the communication can be detected with higher sensitivity in accordance with the fact that the vehicle 100 is not completed, the fact that the degree of coexistence with a person is higher, the fact that the roaming frequency is lower, the fact that the traveling place is indoors, the fact that the number of the mounted internal sensors is smaller, or the fact that the number of the assembled exterior components is smaller, and thus the safety of the unmanned driving of the vehicle 100 can be further improved. On the other hand, in the second process, the interruption of the communication can be detected with the sensitivity suitable for securing the productivity of the vehicle 100 in accordance with the fact that the vehicle 100 is completed, the fact that the degree of coexistence with a person is lower, the fact that the roaming frequency is higher, the fact that the traveling place is outdoors, the fact that the number of the mounted internal sensors is larger, or the fact that the number of the assembled exterior components is larger, and thus the reduction in the productivity of the vehicle 100 can be suppressed.

In the present embodiment, the first monitoring Mr1 includes the safety sensor monitoring, and the aspect of the safety sensor monitoring is different between the first process and the second process in that the degree of use of the safety sensor is higher in the second process than in the first process. Therefore, the safety sensor monitoring can be appropriately executed. In the present embodiment, the number of the mounted safety sensors in the second process is larger than the number of the mounted safety sensors in the first process. Therefore, the degree of use of the safety sensor in the safety sensor monitoring can be increased in accordance with the number of the safety sensors mounted in the vehicle 100, and the safety sensor mounted in the vehicle 100 can be more effectively used in the monitoring.

In the present embodiment, the motor torque monitoring is included in the first monitoring Mr1, and the aspect of the motor torque monitoring is different between the first process and the second process in that the allowable range of the motor torque change is narrower in the first process than in the second process. Therefore, the motor torque monitoring can be appropriately executed. Specifically, in the present embodiment, in the first process, the abnormality of the motor torque can be detected with higher sensitivity in accordance with the fact that the vehicle 100 is not completed, the fact that the degree of coexistence with a person is higher, the fact that the traveling place is indoors, the fact that the number of the mounted internal sensors is smaller, or the fact that the number of the assembled exterior components is smaller, and thus the safety of the unmanned driving of the vehicle 100 can be further improved. On the other hand, in the second process, the abnormality of the motor torque can be detected with the sensitivity suitable for securing the productivity of the vehicle 100 in accordance with the fact that the vehicle 100 is completed, the fact that the degree of coexistence with a person is lower, the fact that the traveling place is outdoors, the fact that the number of the mounted internal sensors is larger, or the fact that the number of the assembled exterior components is larger, and thus the reduction in the productivity of the vehicle 100 can be suppressed.

In the present embodiment, the external sensor monitoring is included in the second monitoring Mr2, and the aspect of the external sensor monitoring is different between the first process and the second process in that the degree of use of the external sensor 300 is higher in the first process than in the second process. Therefore, the external sensor monitoring can be appropriately executed. Specifically, in the present embodiment, in the first process, the approach between the vehicle 100 and a person can be detected by using the external sensor 300 with a higher degree of use in accordance with the fact that the number of the mounted internal sensors is smaller, and the safety of the unmanned driving of the vehicle 100 can be further improved. On the other hand, in the second process, the degree of use of the external sensor 300 can be suppressed in accordance with the fact that the number of the mounted internal sensors is larger. Therefore, as compared to a case where the external sensors 300 are used with a uniform degree of use, the number of the external sensors 300 to be installed can be further reduced, and the cost of constructing the factory FC or the system 50 can be further reduced.

In the present embodiment, the first monitoring Mr1 includes the internal sensor monitoring, and the aspect of the internal sensor monitoring is different between the first process and the second process in that the degree of use of the internal sensor 140 is higher in the second process than in the first process. Therefore, the internal sensor monitoring can be appropriately executed. Specifically, in the present embodiment, in the second process, the degree of use of the internal sensor 140 can be increased in accordance with the fact that the number of the mounted internal sensors 140 is larger, and the mounted internal sensors 140 can be more effectively used in the monitoring.

In the present embodiment, the steering angle monitoring is included in the second monitoring Mr2, and the aspect of the steering angle monitoring is different between the first process and the second process in that the control gain of the steering angle in the first process is smaller than the control gain of the steering angle in the second process. Therefore, the steering angle monitoring can be appropriately executed. Specifically, in the present embodiment, in the first process, the sudden change in the steering angle of the vehicle 100 can be suppressed in accordance with the fact that the vehicle 100 is not completed, the fact that the degree of coexistence with a person is higher, the fact that the traveling place is indoors, the fact that the number of the mounted internal sensors is smaller, or the fact that the number of the assembled exterior components is smaller, and thus the safety of the unmanned driving of the vehicle 100 can be further improved. On the other hand, in the second process, the vehicle 100 can be caused to travel via the unmanned driving in a state where the restriction in the steering angle control for the vehicle 100 is relaxed, in accordance with the fact that the vehicle 100 is completed, the fact that the degree of coexistence with a person is lower, the fact that the traveling place is outdoors, the fact that the number of the mounted internal sensors is larger, or the fact that the number of the assembled exterior components is larger, and thus the reduction in the productivity of the vehicle 100 can be suppressed.

In the present embodiment, the aspect of the steering angle monitoring is different between the first process and the second process in that the upper limit value of the steering angle in the first process is smaller than the upper limit value of the steering angle in the second process. Therefore, the steering angle monitoring can be appropriately executed. Specifically, in the present embodiment, in the first process, the significant change in the steering angle of the vehicle 100 can be suppressed in accordance with the fact that the vehicle 100 is not completed, the fact that the degree of coexistence with a person is higher, the fact that the traveling place is indoors, the fact that the number of the mounted internal sensors is smaller, or the fact that the number of the assembled exterior components is smaller, and thus the safety of the unmanned driving of the vehicle 100 can be further improved. On the other hand, in the second process, the vehicle 100 can be caused to travel via the unmanned driving in a state where the restriction in the steering angle control for the vehicle 100 is relaxed, in accordance with the fact that the vehicle 100 is completed, the fact that the degree of coexistence with a person is lower, the fact that the traveling place is outdoors, the fact that the number of the mounted internal sensors is larger, or the fact that the number of the assembled exterior components is larger, and thus the reduction in the productivity of the vehicle 100 can be suppressed.

In the present embodiment, the second monitoring Mr2 includes the traveling speed monitoring, and the aspect of the traveling speed monitoring is different between the first process and the second process in that the maximum traveling speed in the first process is lower than the maximum traveling speed in the second process. Therefore, the traveling speed monitoring can be appropriately executed. Specifically, in the present embodiment, in the first process, the approach between the vehicle 100 and a person due to a high traveling speed of the vehicle 100 can be suppressed in accordance with the fact that the vehicle 100 is not completed, the fact that the degree of coexistence with a person is higher, the fact that the traveling place is indoors, the fact that the number of the mounted internal sensors is smaller, or the fact that the number of the assembled exterior components is smaller, and thus the safety of the unmanned driving of the vehicle 100 can be further improved. On the other hand, in the second process, the vehicle 100 can be caused to travel via the unmanned driving in a state where the restriction in the traveling speed of the vehicle 100 is relaxed, in accordance with the fact that the vehicle 100 is completed, the fact that the degree of coexistence with a person is lower, the fact that the traveling place is outdoors, the fact that the number of the mounted internal sensors is larger, or the fact that the number of the assembled exterior components is larger, and thus the reduction in the productivity of the vehicle 100 can be suppressed.

In the system 50 according to the present embodiment, the external sensor monitoring and the internal sensor monitoring are executed, the degree of use of the external sensor 300 in the first process is higher than the degree of use of the external sensor 300 in the second process, and the degree of use of the internal sensor 140 in the first process is lower than the degree of use of the internal sensor 140 in the second process. Therefore, the external sensor 300 and the internal sensor 140 can be effectively cooperated in the monitoring. Specifically, for example, in a relatively early stage of the manufacturing process MP, in a case where the number of the internal sensors 140 assembled to the vehicle 100 is smaller, the external sensors 300 can be used preferentially to monitor the approach between the vehicle 100 and the external object. On the other hand, for example, in a relatively later stage of the manufacturing process MP, in a case where the number of the internal sensors 140 assembled to the vehicle 100 is larger, the degree of use of the internal sensors 140 can be increased to cause the vehicle 100 to travel more safely via the unmanned driving and to reduce the degree of use of the external sensor 300.

In the present embodiment, the change in the aspect of the first monitoring Mr1 is implemented by updating the first monitoring data MD1 in response to the update instruction. In this way, the capacity of the data needed to change the aspect of the first monitoring Mr1 can be reduced as compared with a case where the change in the aspect of the first monitoring Mr1 is implemented by using, for example, data in which the aspects of the monitoring in both the first process and the second process are stored. Therefore, the capacity of the memory 112 can be further reduced.

B. Second Embodiment

Figure 7:
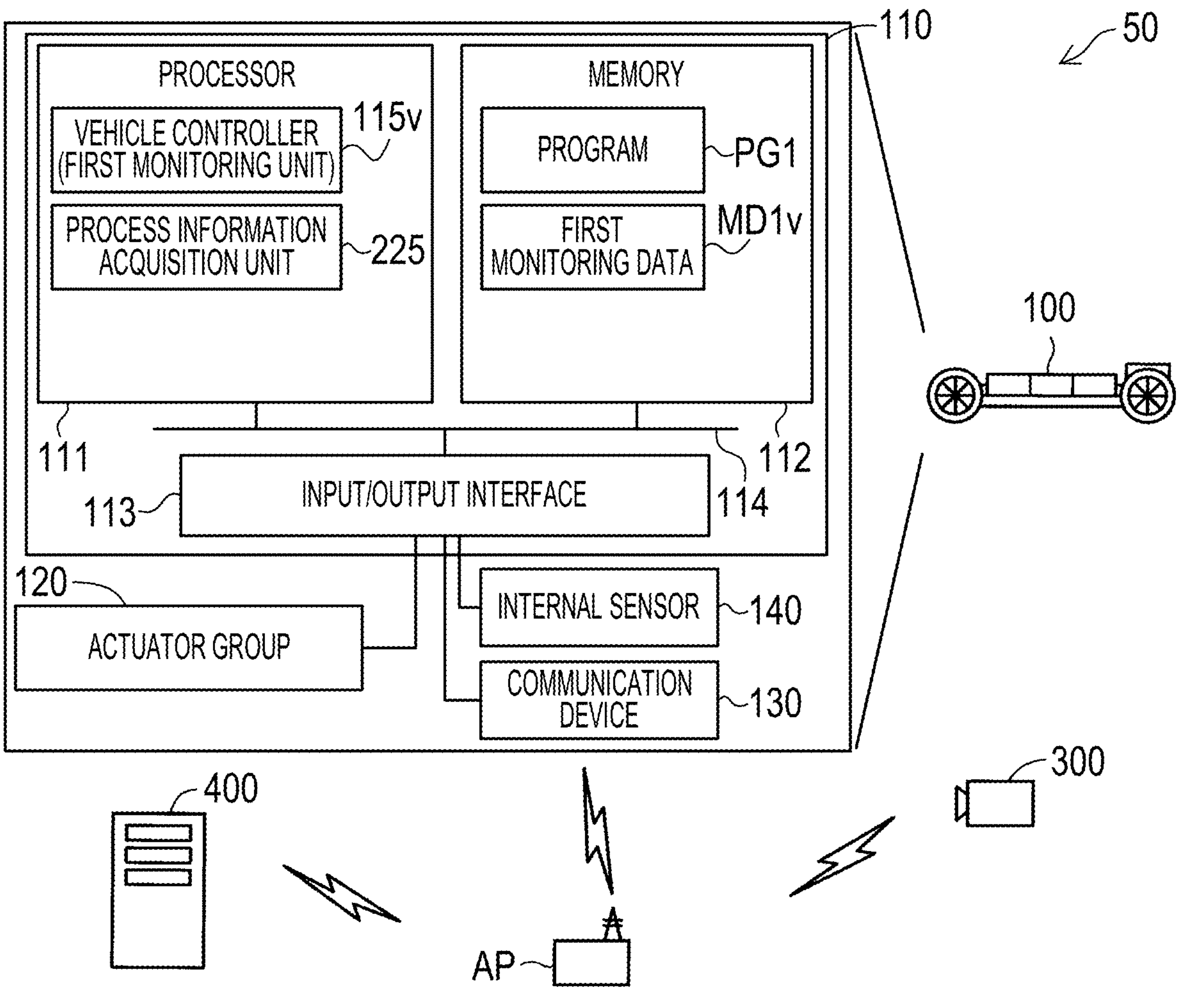
FIG. 7 is a block diagram showing a configuration of a system according to a second embodiment.

FIG. 7 is a block diagram showing a configuration of the system 50 according to a second embodiment. The system 50 according to the present embodiment does not include the server 200, unlike the first embodiment. In addition, the vehicle according to the present embodiment can travel via the autonomous control of the vehicle. Since the device configuration of the vehicle according to the present embodiment is the same as the device configuration of the vehicle 100 according to the first embodiment, the vehicle according to the present embodiment is also referred to as the vehicle 100 for convenience. In the configurations of the system 50 and the vehicle 100 according to the second embodiment, the portions not particularly described are the same as the portions in the first embodiment.

In the present embodiment, the communication device 130 of the vehicle 100 can communicate with the external sensor 300. The processor 111 of the vehicle control device 110 executes the program PG1 stored in the memory 112 to function as a vehicle controller 115*v* and the process information acquisition unit 225. The vehicle controller 115*v* can acquire the output result of the sensor, generate the traveling control signal by using the output result, and output the generated traveling control signal to operate the actuator group 120, thereby causing the vehicle 100 to travel via the autonomous control. In the present embodiment, the detection model DM1, the reference route RR, or first monitoring data MD1*v* is stored in the memory 112 in advance, in addition to the program PG1. The vehicle control device 110 according to the second embodiment corresponds to the first monitoring device and corresponds to the "monitoring device" according to the present disclosure, as in the first embodiment.

FIG. 8 is a diagram showing the monitoring according to the present embodiment. As shown in FIG. 8, the first monitoring Mr1 according to the present embodiment is different from the first monitoring Mr1 according to the first embodiment in that the external sensor monitoring is included. The first monitoring data MD1*v* shown in FIG. 7 includes each process of the vehicle 100 and the first aspect information associated with each process. In the present embodiment, the change in the aspect of the monitoring of the first monitoring Mr1*v* is implemented by referring to the first monitoring data MD1*v* based on the process information, instead of the update of the first monitoring data MD1*v*.

Figure 9:
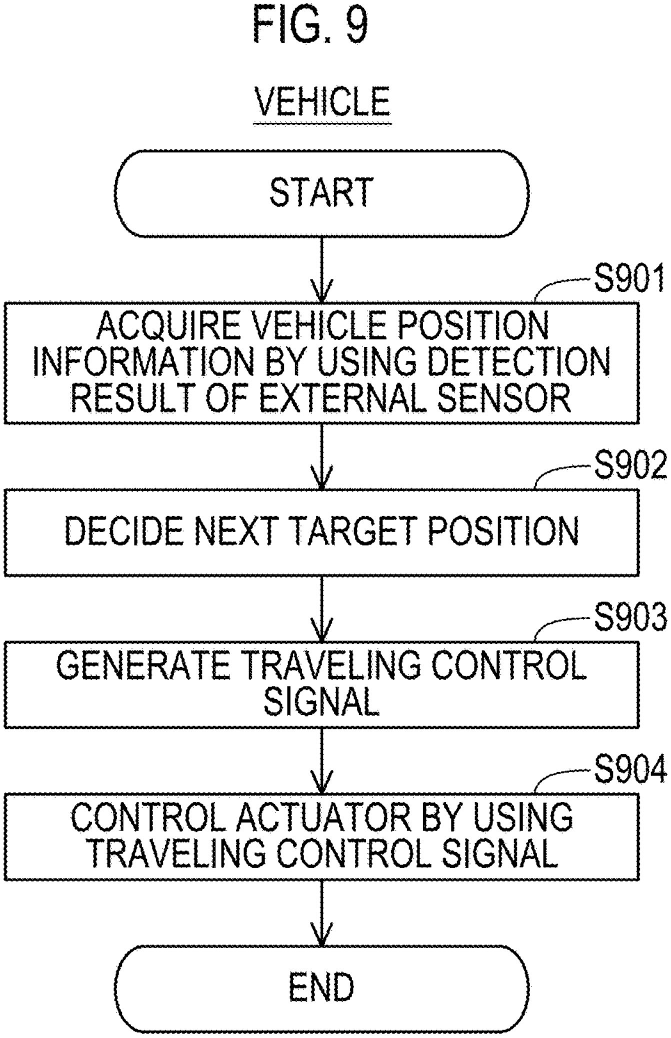
FIG. 9 is a flowchart showing a processing procedure of traveling control for a vehicle according to the second embodiment.

FIG. 9 is a flowchart showing a processing procedure of traveling control of the vehicle 100 according to the second embodiment. In the processing procedure of FIG. 9, the processor 111 of the vehicle 100 executes the program PG1 to function as the vehicle controller 115*v*. In addition, in the processing procedure of FIG. 9, the vehicle controller 115*v* executes the first monitoring Mr1 as the first monitoring unit.

In step S901, the processor 111 of the vehicle control device 110 acquires the vehicle position information by using the detection result output from the camera as the external sensor 300. In step S902, the processor 111 decides the target position to which the vehicle 100 should head next. In step S903, the processor 111 generates the traveling control signal for causing the vehicle 100 to travel toward the decided target position. In step S904, the processor 111 controls the actuator group 120 by using the generated traveling control signal, to cause the vehicle 100 to travel in accordance with the parameters represented by the traveling control signal. The processor 111 repeatedly executes, at a predetermined cycle, the acquisition of the vehicle position information, the decision of the target position, the generation of the traveling control signal, and the control of the actuator. With the system 50 according to the present embodiment, the vehicle 100 can be caused to travel via the autonomous control of the vehicle 100 without the need for the server 200 to remotely control the vehicle 100.

Figure 10:
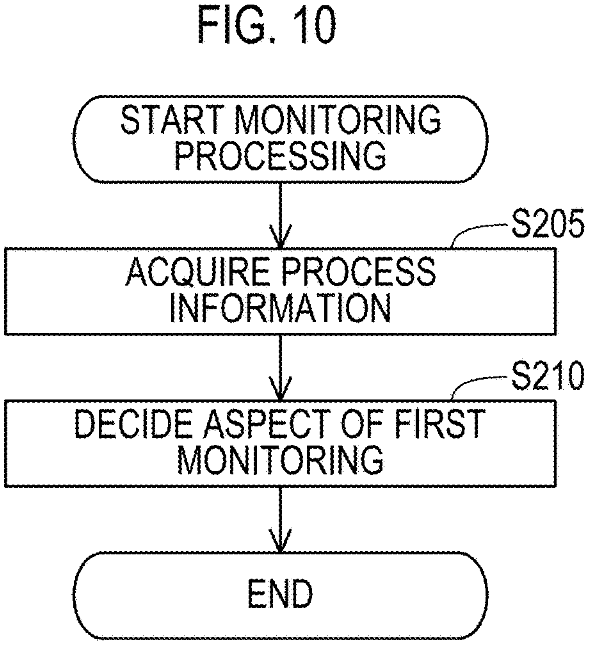
FIG. 10 is a flowchart showing a processing procedure of monitoring processing according to the second embodiment.

FIG. 10 is a flowchart showing a processing procedure of monitoring processing for implementing a monitoring method according to the present embodiment. The monitoring processing of FIG. 10 is executed by the processor 111 at a predetermined cycle, for example.

In step S205, the process information acquisition unit 225 of the vehicle 100 acquires the process information of the vehicle 100 as in step S105 of FIG. 6. In step S210, the vehicle controller 115*v* functioning as the first monitoring unit decides the aspect of the first monitoring Mr1*v* by referring to the first monitoring data MD1*v* based on the process information acquired in step S205. Specifically, in step S210, the vehicle controller 115*v* starts the execution of the first monitoring Mr1*v* using the first aspect information corresponding to the process information acquired in step S205.

With the vehicle control device 110 according to the present embodiment as well, the aspect of the monitoring is different between when the vehicle 100 is in the first process and when the vehicle 100 is in the second process, and thus the monitoring of the vehicle 100 of which the state is sequentially changed within the manufacturing process MP can be appropriately executed.

C. Other Embodiments (C1) In the above-described embodiment, the monitoring includes the communication monitoring, the safety sensor monitoring, the motor torque monitoring, the internal sensor monitoring, the steering angle monitoring, the traveling speed monitoring, and the external sensor monitoring. On the other hand, the monitoring need not include all of the monitoring items described above, may include solely any one of the monitoring items, or may include solely any two or more of the monitoring items. The monitoring may include other monitoring items in addition to or instead of the above-described items. For example, the monitoring may include accelerator pedal monitoring, brake pedal monitoring, and acceleration monitoring.

(C1-1) The accelerator pedal monitoring is monitoring of an operation amount of an accelerator pedal of the vehicle 100. In this case, the difference in the aspect of the monitoring in the accelerator pedal monitoring may include a difference in an accelerator pedal intervention threshold value. The accelerator pedal intervention threshold value is a threshold value for deciding whether or not the vehicle 100 executes an acceleration operation in response to an operation of the accelerator pedal in the vehicle 100 during the unmanned driving. Specifically, in the vehicle 100 during the unmanned driving, when the operation amount of the accelerator pedal exceeds the accelerator pedal intervention threshold value, the vehicle 100 during the unmanned driving executes the acceleration operation in response to the operation of the accelerator pedal. By appropriately setting the accelerator pedal intervention threshold value, in a case where the operator gets on the vehicle 100 during the unmanned driving and performs the work, even when the operator loses balance and unintentionally touches the accelerator pedal, the traveling state of the vehicle 100 during the unmanned driving can be prevented from being unstable. Therefore, for example, in a case where the number of people getting on the vehicle 100 per unit time is larger in the first process than in the second process, from the viewpoint of preventing the traveling state of the vehicle 100 from being unstable, it is preferable that the accelerator pedal intervention threshold value in the first process is higher than the accelerator pedal intervention threshold value in the second process.

(C1-2) The brake pedal monitoring is monitoring of an operation amount of a brake pedal of the vehicle 100. In this case, the difference in the aspect of the monitoring of the brake pedal monitoring may include a difference in a brake pedal intervention threshold value. The brake pedal intervention threshold value is a threshold value for deciding whether or not the vehicle 100 executes a braking operation in response to an operation of the brake pedal in the vehicle 100 during the unmanned driving. Specifically, in the vehicle 100 during the unmanned driving, when the operation amount of the brake pedal exceeds the brake pedal intervention threshold value, the vehicle 100 during the unmanned driving executes the braking operation in response to the operation of the brake pedal. By appropriately setting the brake pedal intervention threshold value, in a case where the operator gets on the vehicle 100 during the unmanned driving and performs the work, even when the operator loses balance and unintentionally touches the brake pedal, the traveling state of the vehicle 100 during the unmanned driving can be prevented from being unstable. For example, in a case where the number of people getting on the vehicle 100 per unit time is larger in the first process than in the second process, from the viewpoint of preventing the traveling state of the vehicle 100 from being unstable, it is preferable that the brake pedal intervention threshold value in the first process is higher than the brake pedal intervention threshold value in the second process.

(C1-3) The acceleration monitoring is monitoring of the acceleration of the vehicle 100. The difference in the aspect of the monitoring in the acceleration monitoring may include a difference in an upper limit value of the acceleration. In the present disclosure, the acceleration includes both the acceleration generated by the vehicle 100 being accelerated and the acceleration generated by the vehicle 100 being decelerated. By appropriately setting the upper limit value of the acceleration, the traveling state of the vehicle 100 can be prevented from being unstable due to sudden acceleration or deceleration of the vehicle 100. Therefore, in a case where the work is performed by the operator getting on the vehicle 100, the operator can be prevented from losing balance due to the sudden acceleration or deceleration of the vehicle 100. In addition, a possibility that the vehicle 100 and the external object approach each other more than needed can be reduced. For example, in the first process, in a case where the vehicle 100 is not completed, in a case where the degree of coexistence with a person is higher, in a case where the roaming frequency is lower, in a case where the traveling place is indoors, in a case where the number of the mounted internal sensors is smaller, or in a case where the number of the assembled exterior components is smaller, it is preferable that the upper limit value of the acceleration in the first process is lower than the upper limit value of the acceleration in the second process.

(C2) In the above-described embodiment, the differences in the aspects of the monitoring in the communication monitoring, the safety sensor monitoring, the motor torque monitoring, the internal sensor monitoring, the steering angle monitoring, the traveling speed monitoring, and the external sensor monitoring respectively include the difference in the determination cycle, the difference in the degree of use of the safety sensor, the difference in the allowable range of the change in the motor torque, the difference in the degree of use of the internal sensor 140, the difference in the control gain of the steering angle, the difference in the maximum traveling speed, and the difference in the degree of use of the external sensor 300. On the other hand, the difference in the aspect of the monitoring of each monitoring included in the monitoring may include another difference in addition to or instead of the above-described differences.

For example, the difference in the aspect of the monitoring in the traveling speed monitoring or the acceleration monitoring may include a difference in a control gain related to longitudinal control of the vehicle 100. Here, the longitudinal control is control related to movement of the vehicle 100 in a front-rear direction. The control gain related to the longitudinal control may be a control gain for controlling the speed of the vehicle 100 or may be a control gain for controlling the acceleration of the vehicle 100. In the first process, in a case where the vehicle 100 is not completed, in a case where the degree of coexistence with a person is higher, in a case where the roaming frequency is lower, in a case where the traveling place is indoors, in a case where the number of the mounted internal sensors is smaller, or in a case where the number of the assembled exterior components is smaller, the vehicle 100 can be caused to travel more safely via the unmanned driving by reducing the control gain related to the longitudinal control. On the other hand, in the second process, in a case where the vehicle 100 is completed, in a case where the degree of coexistence with a person is lower, in a case where the roaming frequency is higher, in a case where the traveling place is outdoors, in a case where the number of the mounted internal sensors is larger, or in a case where the number of the assembled exterior components is larger, the time required for the vehicle 100 to reach the target speed can be shortened by increasing the control gain related to the longitudinal control, and thus the vehicle 100 can be caused to move efficiently. Control related to movement of the vehicle 100 in a right-left direction is also referred to as lateral control. The control gain of the steering angle corresponds to the control gain related to the lateral control. The control gain changed by updating unmanned driving information may be a control gain related to the feedback control or may be a control gain of the feedforward control. The control gain changed by updating the unmanned driving information may be a control gain for controlling the motor torque or may be a control gain for controlling a rotation angle of the motor.

(C3) In the above-described embodiment, the manufacturing stage of the vehicle 100, the degree of coexistence with a person, the roaming frequency, the number of the mounted internal sensors, the number of the mounted safety sensors, and the number of the assembled exterior components, and the traveling place are different between the first process and the second process. On the other hand, all of the vehicle situations need not be different between the first process and the second process, solely any one of the vehicle situations may be different, or solely any two or more of the vehicle situations may be different. For example, both the first process and the second process may be processes in which the vehicle 100 is not completed, or both the first process and the second process may be processes in which the vehicle 100 is completed. In the above-described embodiment, the first process is a process until the vehicle 100 is completed after the vehicle 100 is constructed to a state where the vehicle 100 can travel via the unmanned driving, and the second process is a process after the vehicle 100 is completed, but the present disclosure is not limited thereto. In addition, another vehicle situation may be different between the first process and the second process in addition to or instead of each of the above-described vehicle situations.

(C3-1) For example, solely the degree of coexistence with a person may be different between the first process and the second process. The first process may be defined as, for example, a process in which the degree of coexistence with a person is lower than in the second process. In this case, the degree of coexistence with a person may be evaluated by using, for example, an evaluation score representing a predetermined degree of coexistence for each process executed on the vehicle 100. The evaluation score may be defined as the number of people who can exist within a predetermined distance range from the vehicle 100 per unit time. For example, the evaluation score of a process of executing the assembling of the component to the vehicle 100 by a person is higher than the evaluation score of a process of not executing the work on the vehicle 100 by a person. In addition, between the two processes of executing the work on the vehicle 100 by a person, for example, the evaluation score of a process in which the number of people who execute the work is larger or a process in which a work time is relatively long may be higher. The evaluation score may take into account, for example, the proximity of the track on which the vehicle 100 travels to a sidewalk, or the number of times or frequency with which a person appears at the traveling place of the vehicle 100. In this case, the evaluation score need solely be defined such that the degree of coexistence is higher as a distance between the track and the sidewalk is shorter and as the number of times or frequency with which the person appears at the traveling place is higher. In each of the above-described embodiments, in the internal sensor monitoring or the safety sensor monitoring, the degree of use of the internal sensor 140 or the degree of use of the safety sensor in the process having a higher degree of coexistence is lower than each degree of use thereof in the process having a lower degree of coexistence, but the present disclosure is not limited thereto. For example, each degree of use thereof in a process having a higher degree of coexistence may be higher than each degree of use thereof in a process having a lower degree of coexistence. In this way, the internal sensor monitoring or the safety sensor monitoring can be more appropriately executed in accordance with a higher degree of coexistence. In particular, in a case where the number of the mounted internal sensors or the number of the mounted safety sensors is larger in the first process than in the second process, the internal sensor monitoring or the safety sensor monitoring can be effectively executed.

(C3-2) For example, solely the roaming frequency may be different between the first process and the second process. The first process may be defined as, for example, a process in which the roaming frequency is lower than in the second process. As described above, the roaming frequency in each process can be calculated based on the installation interval of the access points AP or the traveling speed of the vehicle 100.

(C3-3) For example, the number of the mounted internal sensors may be different between the first process and the second process. The first process may be defined as, for example, a process in which the number of the mounted internal sensors is smaller than in the second process. In this case, the second process may be defined as, for example, a process after predetermined one or more internal sensors 140 are mounted in the vehicle 100 from the first process. In addition, in this case, in the internal sensor monitoring or the safety sensor monitoring in the second process, the use of the internal sensor 140 or the safety sensor newly mounted in the vehicle 100 between the first process and the second process may be started. In this way, the sensors that are mounted in the vehicle 100 one by one in the manufacturing process MP can be used for the monitoring more appropriately.

(C3-4) For example, solely the number of the assembled exterior components may be different between the first process and the second process. The first process may be defined as, for example, a process in which the number of the assembled exterior components is smaller than in the second process.

(C3-5) For example, solely the traveling place may be different between the first process and the second process. The first process may be defined as, for example, a process in which the traveling place is different from the second process. The "traveling place is different" may be, for example, a difference in whether the vehicle 100 travels outdoors or indoors, or a difference in a traveling area in which the vehicle 100 travels. Each traveling area is determined in advance as, for example, each section on the track within the factory FC.

(C3-6) For example, the first process may be defined as a process before a predetermined inspection process is executed, and the second process may be defined as a process after the inspection process is executed. The inspection process in this case may be, for example, a process of inspecting whether or not an assembly state or a connection state of a predetermined component with respect to the vehicle 100 is appropriate. In this case, in the first process, for example, the allowable range in the motor torque monitoring may be narrowed. With such control, the vehicle 100 can be prevented from continuing to travel in a state where the component of the vehicle 100 or a connector of a wire harness is detached due to the contact between the vehicle 100 and the external object or the riding of the vehicle 100 on the external object. In the first process, for example, the gain of the steering angle or the upper limit value of the steering angle in the steering angle monitoring may be reduced, the gain of the traveling speed or the maximum traveling speed in the traveling speed monitoring may be reduced, or the gain of the acceleration or the upper limit value of the acceleration in the acceleration monitoring may be reduced. With such control, the component of the vehicle 100 or the connector of the wire harness can be prevented from being detached due to the sudden acceleration or deceleration of the vehicle 100 or a sudden change in direction.

(C3-7) For example, the first process may be defined as a process in which the road width of the track on which the vehicle 100 travels is narrower or a process in which the vehicle 100 travels through more curves than in the second process. In this case, for example, in the first process, the gain of the steering angle or the upper limit value of the steering angle in the steering angle monitoring may be reduced, the gain of the traveling speed or the maximum traveling speed in the traveling speed monitoring may be reduced, or the gain of the acceleration or the upper limit value of the acceleration in the acceleration monitoring may be reduced. With such control, the vehicle 100 can be caused to travel more safely via the unmanned driving even in a case where the road width of the track is narrower or the number of curves on the track is larger. On the other hand, in a case where the road width of the track is wide or in a case where the number of curves on the track is small, the vehicle 100 can be caused to travel more efficiently.

(C3-8) For example, the first process may be defined as a process in which there are more places that may be blind spots in the body detection using the internal sensor 140 or the abnormality detection using the safety sensor than in the second process. In this case, for example, the degree of use of the external sensor 300 in the external sensor monitoring may be increased such that the external sensor 300 can cover a place that may be the blind spot in the body detection using the internal sensor 140 or the abnormality detection using the safety sensor. Examples of the process in which there are many places that may be the blind spots include a process in which the road width of the track is wider, a process in which the vehicle 100 travels through more curves, and a process in which the number or volume of bodies, such as structures or devices, disposed in the vicinity of the track on which the vehicle 100 travels is larger.

(C3-9) The first process may be defined as, for example, a process in which a weight of the vehicle 100 is smaller than in the second process. When the weight of the vehicle 100 is smaller, the probability that the number of the components assembled to the vehicle 100 or the number of the sensors mounted in the vehicle 100 is smaller is higher than when the weight of the vehicle 100 is larger.

(C4) In the above-described first embodiment, the first monitoring Mr1 includes the communication monitoring, the safety sensor monitoring, the motor torque monitoring, and the internal sensor monitoring, and the second monitoring Mr2 includes the external sensor monitoring, the steering angle monitoring, and the traveling speed monitoring, but the present disclosure is not limited thereto. That is, for example, a part or all of the communication monitoring, the safety sensor monitoring, the motor torque monitoring, and the internal sensor monitoring may be executed by the server 200, or a part or all of the external sensor monitoring, the steering angle monitoring, and the traveling speed monitoring may be executed by the vehicle 100 as in the second embodiment. For example, the system 50 is configured such that the vehicle 100 transmits a response to the server 200 within a predetermined time when the server 200 transmits predetermined information to the vehicle 100, whereby the server 200 can execute the communication monitoring. Specifically, with such a configuration, the server 200 can transmit the predetermined information to the vehicle 100 and determine that the communication is interrupted in a case where the response from the vehicle 100 cannot be received within the predetermined time. In a case where the server 200 executes the safety sensor monitoring, the motor torque monitoring, and the internal sensor monitoring, the server 200 need solely acquire a detection value of the safety sensor, a detection value of the motor torque, and a detection result of the internal sensor 140 from the vehicle 100. In a case where the server 200 executes the steering angle monitoring or the traveling speed monitoring, the server 200 may acquire a detection value of the steering angle or a detection value of the traveling speed from the vehicle 100, or may execute the steering angle monitoring or the traveling speed monitoring based on a traveling history of the vehicle 100, a generation history of the traveling control signal, an acquisition history of the vehicle position information, or the like. In addition, for example, a computer different from the server 200 or the vehicle 100 may function as the monitoring device, and a processor of the computer may function as the monitoring unit.

(C5) In the first embodiment, the change in the aspect of the first monitoring Mr1 is implemented by updating the first monitoring data MD1 in response to the update instruction. On the other hand, the change in the aspect of the first monitoring Mr1 need not be implemented by updating the first monitoring data MD1. In this case, the vehicle 100 may implement the change in the aspect of the first monitoring Mr1 by referring to the database based on the process information as in the second embodiment. In this case, the process information may be acquired by the server 200 and transmitted to the vehicle 100, or may be acquired by the vehicle 100 without passing through the server 200.

(C6) In each of the above-described embodiments, the same monitoring item may be executed by the first monitoring unit and the second monitoring unit. In this case, for example, any one of the restriction processing and the abnormality processing related to the same monitoring item may be executed by the first monitoring unit, and the other may be executed by the second monitoring unit. For example, in the traveling speed monitoring or the steering angle monitoring, the restriction processing may be executed by the second monitoring unit, and the abnormality processing may be executed by the first monitoring unit. In this form, each of the case where the traveling speed is expected to exceed the maximum traveling speed, the case where the steering angle control gain is expected to exceed the threshold value, and the case where the steering angle is expected to exceed the upper limit value may include a case where an inappropriate traveling control signal for causing the abnormality in each monitoring to occur is transmitted from the server 200 to the vehicle 100. The abnormality processing may be executed by the second monitoring unit, and the restriction processing may be executed by the first monitoring unit.

(C7) In each of the above-described embodiments, the external sensor 300 is not limited to the camera, and may be, for example, a distance measurement device. The distance measurement device is, for example, a light detection and ranging (LiDAR). In this case, the detection result output by the external sensor 300 may be three-dimensional point cloud data representing the vehicle 100. In this case, the server 200 or the vehicle 100 may acquire the vehicle position information via template matching using the three-dimensional point cloud data as the detection result, and reference point cloud data prepared in advance.

(C8) In each of the above-described embodiments, the process management device 400 need not be provided in the system 50. In this case, the function implemented by the process management device 400 may be implemented by another device in the system 50. For example, the server 200 may function as the process management device 400.

(C9) In the first embodiment, the server 200 executes the processing from the acquisition of the vehicle position information to the generation of the traveling control signal. On the other hand, the vehicle 100 may execute at least a part of the processing from the acquisition of the vehicle position information to the generation of the traveling control signal. For example, the following forms (1) to (3) may be used.

(1) The server 200 may acquire the vehicle position information, decide the target position to which the vehicle 100 should head next, and generate the route from the current position of the vehicle 100 represented by the acquired vehicle position information to the target position. The server 200 may generate a route to the target position between the current position and the destination or may generate a route to the destination. The server 200 may transmit the generated route to the vehicle 100. The vehicle 100 may generate the traveling control signal for causing the vehicle 100 to travel on the route received from the server 200, and control the actuator group 120 by using the generated traveling control signal.

(2) The server 200 may acquire the vehicle position information and transmit the acquired vehicle position information to the vehicle 100. The vehicle 100 may decide the target position to which the vehicle 100 should head next, generate the route from the current position of the vehicle 100 represented by the received vehicle position information to the target position, generate the traveling control signal such that the vehicle 100 travels on the generated route, and control the actuator group 120 by using the generated traveling control signal.

(3) In the above-described forms (1) and (2), at least one of the generation of the route and the generation of the traveling control signal may use the detection result output from the internal sensor 140. For example, in the above-described form (1), the server 200 may acquire the detection result of the internal sensor 140 and reflect the detection result of the internal sensor 140 in the route when the route is generated. In the above-described form (1), the vehicle 100 may acquire the detection result of the internal sensor 140 and reflect the detection result of the internal sensor 140 to the traveling control signal when the traveling control signal is generated. In the above-described form (2), the vehicle 100 may acquire the detection result of the internal sensor 140 and reflect the detection result of the internal sensor 140 to the route when the route is generated. In the above-described form (2), the vehicle 100 may acquire the detection result of the internal sensor 140 and reflect the detection result of the internal sensor 140 to the traveling control signal when the traveling control signal is generated.

(C10) In the second embodiment, the detection result output from the internal sensor 140 may be used for at least one of the generation of the route and the generation of the traveling control signal. For example, the vehicle 100 may acquire the detection result of the internal sensor 140 and reflect the detection result of the internal sensor 140 to the route when the route is generated. The vehicle 100 may acquire the detection result of the internal sensor 140 and reflect the detection result of the internal sensor 140 to the traveling control signal when the traveling control signal is generated.

(C11) In the second embodiment, the vehicle 100 acquires the vehicle position information by using the detection result of the external sensor 300. On the other hand, the vehicle 100 may acquire the vehicle position information by using the detection result of the internal sensor 140, decide the target position to which the vehicle 100 should head next, generate the route from the current position of the vehicle 100 represented by the acquired vehicle position information to the target position, generate the traveling control signal for traveling on the generated route, and control the actuator group 120 by using the generated traveling control signal. In this case, the vehicle 100 can travel without using the detection result of the external sensor 300 at all. The vehicle 100 may acquire a target arrival time or traffic jam information from the outside of the vehicle 100 and reflect the target arrival time or the traffic jam information to at least one of the route and the traveling control signal. In addition, all of the functions of the system 50 may be provided in the vehicle 100. That is, the processing implemented by the system 50 according to the present disclosure may be implemented by the vehicle 100 alone.

(C12) In the first embodiment, the server 200 automatically generates the traveling control signal to be transmitted to the vehicle 100. On the other hand, the server 200 may generate the traveling control signal to be transmitted to the vehicle 100 in response to an operation of an external operator who is located outside the vehicle 100. For example, the external operator may operate an operation device including a display that displays the captured image output from the external sensor 300, a steering wheel, an accelerator pedal, and a brake pedal for remotely operating the vehicle 100, and a communication device that communicates with the server 200 via wired communication or wireless communication, and the server 200 may generate the traveling control signal in response to the operation applied to the operation device.

(C13) In each of the above-described embodiments, the vehicle 100 need solely have a configuration capable of moving via the unmanned driving, and may have, for example, a form of a platform having a configuration described below. Specifically, the vehicle 100 need solely include at least the vehicle control device 110 and the actuator group 120, in order to exhibit the three functions of "traveling", "turning", and "stopping" via the unmanned driving. In a case where the vehicle 100 acquires the information from the outside for the unmanned driving, the vehicle 100 need solely further include the communication device 130. That is, the vehicle 100 that can move via the unmanned driving need not be mounted with at least a part of the interior components, such as the driver's seat and the dashboard, need not be mounted with at least a part of the exterior components, such as the bumper and the fender mirror, and need not be mounted with the bodyshell. In this case, the remaining components, such as the bodyshell, may be mounted in the vehicle 100 before the vehicle 100 is shipped from a factory FC, or the remaining components, such as the bodyshell, may be mounted in the vehicle 100 after the vehicle 100 is shipped from the factory FC in a state where the remaining components, such as the bodyshell, are not mounted in the vehicle 100. Each component may be mounted from any direction, such as the upper side, the lower side, the front side, the rear side, the right side, or the left side of the vehicle 100, and may be mounted from the same direction or different directions. The position decision can be made for the form of the platform in the same manner as the vehicle 100 according to the first embodiment.

(C14) The vehicle 100 may be manufactured by combining a plurality of modules. The module means a unit configured by one or more components assembled depending on the configuration or the function of the vehicle 100. For example, the platform of the vehicle 100 may be manufactured by combining a front module that constitutes a front portion of the platform, a center module that constitutes a center portion of the platform, and a rear module that constitutes a rear portion of the platform. In addition, the number of the modules constituting the platform is not limited to three, and may be two or less or four or more. In addition to or instead of the platform, a portion of the vehicle 100 that is different from the platform may be modularized. In addition, various modules may include any exterior component, such as a bumper or a grille, or any interior component, such as a seat or a console. The present disclosure is not limited to the vehicle 100, a mobile body of any aspect may be manufactured by combining the modules. Such a module may be manufactured, for example, by joining the components via welding, a fastener, or the like, or may be manufactured by integrally molding at least a part of the modules as one component via casting. A molding method of integrally molding at least a part of the modules as one component is also called giga casting or mega casting. By using giga casting, each unit of the mobile body that has been formed by joining a plurality of components in the related art can be formed as one component. For example, the front module, the center module, and the rear module may be manufactured by using giga casting.

(C15) The transport of the vehicle 100 using the traveling of the vehicle 100 via the unmanned driving is also referred to as "autonomous transport". A configuration for implementing the autonomous transport is also referred to as "vehicle remote control autonomous driving transport system". A production method of producing the vehicle 100 by using the autonomous transport is also referred to as "autonomous production". In the autonomous production, for example, at the factory FC that manufactures the vehicle 100, at least a part of the transport of the vehicle 100 is implemented by the autonomous transport.

(C16) In each of the above-described embodiments, a part or all of the functions and the processing that are implemented by software may be implemented by hardware. Alternatively, a part or all of the functions and the processing that are implemented by hardware may be implemented by software. As the hardware for implementing various functions in each of the above-described embodiments, various circuits, such as an integrated circuit or a discrete circuit, may be used.

The present disclosure is not limited to the above-described embodiments, and can be implemented with various configurations without departing from the gist of the present disclosure. For example, the technical features in the embodiments corresponding to the technical features in the respective forms described in SUMMARY can be replaced or combined as appropriate to solve a part or all of the above-described objects, or to achieve a part or all of the above-described effects. In a case where the technical features are not described as being always needed in the present specification, the features can be deleted as appropriate.

What is claimed is:

1. A monitoring device comprising:

a monitoring unit configured to execute monitoring related to safety of a mobile body that is movable within a manufacturing process via unmanned driving, wherein an aspect of the monitoring of the monitoring unit when the mobile body is in a first process is different from an aspect of the monitoring of the monitoring unit when the mobile body is in a second process;

at a predetermined cycle, determine whether or not communication is interrupted, wherein a cycle in the first process is shorter than a cycle in the second process, wherein a determination that the communication is interrupted corresponds to a detection of an abnormality; and control an actuator group of the mobile body to execute stop processing that stops the mobile body based upon the abnormality being detected during the monitoring.

2. The monitoring device according to claim 1, wherein:

the monitoring unit is configured to execute the monitoring by using a safety sensor mounted in the mobile body; and the monitoring unit is configured to, in the second process, execute the monitoring by using the safety sensor with a higher degree of use than a degree of use of the safety sensor in the first process.

3. The monitoring device according to claim 2, wherein a number of the safety sensors mounted in the mobile body in the second process is larger than a number of the safety sensors mounted in the mobile body in the first process.

4. The monitoring device according to claim 1, wherein:

the monitoring unit is configured to monitor a motor torque of the mobile body;

the monitoring unit is configured to determine that the mobile body is not in a normal state when a degree of change in the motor torque exceeds an allowable range; and the allowable range of the degree of change in the motor torque in the first process is narrower than the allowable range in the second process.

5. The monitoring device according to claim 1, wherein:

the monitoring unit is configured to monitor approach between the mobile body and an object outside the mobile body by using an external sensor located outside the mobile body; and the monitoring unit is configured to, in the first process, monitor the approach between the mobile body and the object outside the mobile body by using the external sensor with a higher degree of use than a degree of use of the external sensor in the second process.

6. The monitoring device according to claim 1, wherein:

the monitoring unit is configured to monitor approach between the mobile body and an object outside the mobile body by using an internal sensor mounted in the mobile body; and the monitoring unit is configured to, in the second process, monitor the approach between the mobile body and the object outside the mobile body by using the internal sensor with a higher degree of use than a degree of use of the internal sensor in the first process.

7. The monitoring device according to claim 1, wherein:

the monitoring unit is configured to execute monitoring related to a steering angle of a vehicle as the mobile body; and the monitoring unit is configured to, in the first process, execute the monitoring related to the steering angle of the vehicle by using a smaller control gain of the steering angle than a control gain of the steering angle in the second process.

8. The monitoring device according to claim 1, wherein:

the monitoring unit is configured to execute monitoring related to a steering angle of a vehicle as the mobile body; and the monitoring unit is configured to, in the first process, determine a traveling abnormality of the vehicle by using a smaller upper limit value of the steering angle than an upper limit value of the steering angle in the second process.

9. The monitoring device according to claim 1, wherein:

the monitoring unit is configured to monitor a movement speed of the mobile body;

the monitoring unit is configured to, in the first process, determine that a movement state of the mobile body is abnormal when the movement speed of the mobile body exceeds a first maximum movement speed threshold value;

the monitoring unit is configured to, in the second process, determine that the movement state of the mobile body is abnormal when the movement speed of the mobile body exceeds a second maximum movement speed threshold value; and the first maximum movement speed threshold value is smaller than the second maximum movement speed threshold value.

10. The monitoring device according to claim 1, wherein a degree of coexistence of the mobile body with a person is higher in the first process than in the second process.

11. The monitoring device according to claim 1, wherein a maximum movement speed of the mobile body is smaller in the first process than in the second process.

12. The monitoring device according to claim 1, wherein a roaming frequency of the mobile body is lower in the first process than in the second process.

13. The monitoring device according to claim 1, wherein the number of sensors mounted in the mobile body is smaller in the first process than in the second process.

14. The monitoring device according to claim 1, wherein the number of exterior components assembled to the mobile body is smaller in the first process than in the second process.

15. The monitoring device according to claim 1, wherein:

the mobile body is not completed in the first process; and the mobile body is completed in the second process.

16. The monitoring device according to claim 1, wherein:

the mobile body moves indoors in the first process; and the mobile body moves outdoors in the second process.

17. A monitoring method comprising:

executing monitoring related to safety of a mobile body that moves within a manufacturing process via unmanned driving, wherein an aspect of the monitoring is different between when the mobile body is in a first process and when the mobile body is in a second process;

the monitoring, which is executed at a predetermined cycle, determines whether or not communication is interrupted, a cycle in the first process is shorter than a cycle in the second process, wherein a determination that the communication is interrupted corresponds to a detection of an abnormality; and the monitoring includes controlling an actuator group of the mobile body to execute stop processing that stops the mobile body based upon the abnormality being detected during the monitoring.

18. A system that executes monitoring related to safety of a mobile body, the system comprising the mobile body that is movable within a manufacturing process via unmanned driving, the mobile body including an actuator group, wherein an aspect of the monitoring is different between when the mobile body is in a first process and when the mobile body is in a second process, wherein:

the monitoring is executed at a predetermined cycle and determines whether or not communication is interrupted, a cycle in the first process is shorter than a cycle in the second process, a determination that the communication is interrupted corresponds to a detection of an abnormality; and the system is configured to control the actuator group to execute stop processing that stops the mobile body based upon the abnormality being detected in the monitoring.

19. The system according to claim 18, wherein:

the system is configured to monitor approach between the mobile body and an object outside the mobile body by using an external sensor located outside the mobile body and an internal sensor mounted in the mobile body; and the system is configured to in the first process, monitor the approach between the mobile body and the object outside the mobile body by using the external sensor with a higher degree of use than a degree of use of the external sensor in the second process, and in the first process, monitor the approach between the mobile body and the object outside the mobile body by using the internal sensor with a lower degree of use than a degree of use of the internal sensor in the second process.

* * * * *